(12) United States Patent
Tomura et al.

(10) Patent No.: US 9,745,017 B2
(45) Date of Patent: Aug. 29, 2017

(54) HANDLEBAR FIXING STRUCTURE

(71) Applicant: HONDA MOTOR CO., LTD., Tokyo (JP)

(72) Inventors: Kineo Tomura, Wako (JP); Yotaro Mori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/800,967

(22) Filed: Jul. 16, 2015

(65) Prior Publication Data

US 2016/0031520 A1 Feb. 4, 2016

(30) Foreign Application Priority Data

Jul. 31, 2014 (JP) .................................. 2014-156201
Sep. 16, 2014 (JP) .................................. 2014-187775

(51) Int. Cl.
*B62K 21/14* (2006.01)
*B62K 21/20* (2006.01)
(Continued)

(52) U.S. Cl.
CPC .............. *B62K 21/20* (2013.01); *B62K 11/14* (2013.01); *B62K 21/08* (2013.01)

(58) Field of Classification Search
CPC ......... B62K 21/20; B62K 11/14; B62K 21/08
See application file for complete search history.

(56) References Cited

U.S. PATENT DOCUMENTS 2,396,041 A * 3/1946 Du Pont ................ B62K 21/14
74/551.2
5,310,203 A * 5/1994 Chen ...................... B62K 25/08
267/141.1
(Continued)

FOREIGN PATENT DOCUMENTS

EP 2261527 A2 * 12/2010 ............. B62K 21/08
FR 2899867 A1 * 10/2007 ............. B62K 21/08
(Continued)

OTHER PUBLICATIONS

Translation of foreign document FR2899867.*

*Primary Examiner* — Kevin Hurley
*Assistant Examiner* — Gabriela C Craciun
(74) *Attorney, Agent, or Firm* — Birch, Stewart, Kolasch & Birch, LLP

(57) ABSTRACT

A handlebar fixing structure enabling a handlebar to be attached to a high position to provide high vibration absorbency. The handlebar fixing structure includes a handlebar, a handlebar post supported above a steering system, and a handlebar clamper for fixing the handlebar to the handlebar post. The handlebar clamper includes a first damper member and a second damper member disposed so as to sandwich a cylindrical portion of the handlebar post and the handlebar from a direction orthogonal to the vehicle widthwise direction. An elastic member is interposed between the first clamper member and the handlebar post and between the second damper member and the handlebar post. The first damper member and the second clamper member are coupled with each other by a bolt and include abutting faces for abutting with each other so as to receive an axial force of the bolt.

17 Claims, 15 Drawing Sheets

(51) Int. Cl.
  *B62K 21/08*  (2006.01)
  *B62K 11/14*  (2006.01)

(56) References Cited

U.S. PATENT DOCUMENTS

| | | | | |
|---|---|---|---|---|
| 6,017,047 A * | 1/2000 | Hoose | ............... | B60G 3/01 |
| | | | | 280/276 |
| 6,332,625 B1 * | 12/2001 | Fukunaga | ............... | B62K 21/20 |
| | | | | 180/222 |
| 6,712,541 B1 * | 3/2004 | Henricksen | ............ | B62K 21/04 |
| | | | | 403/286 |
| 6,802,519 B2 * | 10/2004 | Morgan | ............... | F16F 9/145 |
| | | | | 280/272 |
| 6,953,201 B1 * | 10/2005 | VanDeMortel | ........ | B62K 21/14 |
| | | | | 280/276 |
| 7,118,302 B1 * | 10/2006 | Durham | ............... | B62K 21/04 |
| | | | | 280/276 |
| 7,178,820 B2 * | 2/2007 | Terblanche | ............ | B62K 25/08 |
| | | | | 280/276 |
| 7,490,843 B2 * | 2/2009 | Czysz | ............... | B62K 21/04 |
| | | | | 280/275 |
| 7,578,514 B2 * | 8/2009 | Czysz | ............... | B62K 25/08 |
| | | | | 280/276 |
| 7,832,752 B2 * | 11/2010 | Czysz | ............... | B62K 21/06 |
| | | | | 280/275 |
| 8,833,785 B2 * | 9/2014 | Wagner | ............... | B62K 21/00 |
| | | | | 180/219 |
| 2002/0020249 A1 * | 2/2002 | Darland | ............... | B62K 11/14 |
| | | | | 74/551.8 |
| 2006/0279059 A1 * | 12/2006 | Czysz | ............... | B62K 25/08 |
| | | | | 280/276 |
| 2007/0194553 A1 * | 8/2007 | Czysz | ............... | B62K 21/04 |
| | | | | 280/275 |
| 2008/0129009 A1 * | 6/2008 | Czysz | ............... | B62K 21/06 |
| | | | | 280/275 |
| 2008/0246247 A1 * | 10/2008 | Hoshi | ............... | B62J 11/00 |
| | | | | 280/280 |
| 2014/0062055 A1 * | 3/2014 | Bochereau | ............ | B62K 21/20 |
| | | | | 280/276 |
| 2015/0158433 A1 * | 6/2015 | Watanabe | ............ | B62J 11/00 |
| | | | | 280/270 |
| 2015/0232147 A1 * | 8/2015 | Hirayama | ............ | B62K 21/02 |
| | | | | 280/267 |
| 2016/0152296 A1 * | 6/2016 | Eckert | ............... | B62K 21/12 |
| | | | | 280/87.041 |

FOREIGN PATENT DOCUMENTS

| | | |
|---|---|---|
| JP | 2006-224959 A | 8/2006 |
| JP | 2012-144145 A | 8/2012 |

* cited by examiner

HANDLEBAR FIXING STRUCTURE

CROSS-REFERENCE TO RELATED APPLICATIONS

The present application claims priority under 35 USC 119 to Japanese Patent Application No. 2014-156201 filed Jul. 31, 2014 and Japanese Patent Application No. 2014-187775 filed Sep. 16, 2014 the entire contents of which are hereby incorporated by reference.

BACKGROUND OF THE INVENTION

1. Field of the Invention

The present invention relates to a handlebar fixing structure.

2. Description of Background Art

A handlebar fixing structure is known wherein a handlebar post for clamping a handlebar is fixed to a top bridge at an upper portion of a steering system. A handlebar fixing structure is known wherein the handlebar post is fixed through an elastic member in order to prevent transmission of driving vibration, engine vibration and so forth to the hands of the driver. See, for example, Japanese Patent Laid-Open No. 2012-144145. In the handlebar fixing structure for Japanese Patent Laid-Open No. 2012-144145, the elastic member is interposed between a lower face of the handlebar post and the top bridge.

Depending upon the vehicle, a handlebar is sometimes required to be at a high position at an upper portion of a steering system. In this case, an attachment position of the handlebar can be set higher by setting the length of a handlebar post extending upwardly from an upper portion of the steering system longer. However, if the handlebar post in the conventional structure is simply elongated upwardly, then the load by a bending moment or the like which acts on the elastic member increases as the length of the handlebar posts increases and the attachment rigidity of the handlebar becomes less likely to be secured. Further, while the attachment rigidity of the handlebar can be secured by making the elastic member harder, the absorbency of vibration is decreased.

SUMMARY AND OBJECTS OF THE INVENTION

The present invention has been made in view of such a situation as described above. It is an object of an embodiment of the present invention to provide a handlebar fixing structure that allows a handlebar to be attached to a high position and has high vibration absorbency.

In order to attain the object described above, according to an embodiment of the present invention, there is provided a handlebar fixing structure, including a steering system (35) for steerably supporting a front side traveling unit (2), which is attached for steering to a front portion of a vehicle body. A handlebar (30) is attached above the steering system (35) and extends in a vehicle widthwise direction. A handlebar post (60) is supported above the steering system (35) for supporting the handlebar (30) thereon. A; handlebar damper (61) is attached to the handlebar post (60) for fixing the handlebar (30) to the handlebar post (60). The handlebar damper (61) includes a first damper member (81) and a second damper member (82) disposed across a tip end portion (71) of the handlebar post (60) and the handlebar (30) from a direction orthogonal to the vehicle widthwise direction. An elastic member (72) is interposed between the first clamper member (81) and the handlebar post (60) and between the second damper member (82) and the handlebar post (60). The first clamper member (81) and the second clamper member (82) are coupled with each other by a bolt (59) having abutting faces (86, 93) for abutting with each other so as to receive an axial force of the bolt (59).

According to an embodiment of the present invention, the handlebar is fixed to the handlebar clamper disposed so as to sandwich the tip end portion of the handlebar post. Thus, the handlebar can be attached to a high position and the handlebar damper can be elastically supported by the elastic members between the handlebar post and the first clamper member and second damper member. Consequently, the handlebar fixing structure can be obtained which allows the handlebar to be attached to a high position and in addition has a high vibration absorbency.

According to an embodiment of the present invention, the handlebar fixing structure is configured such that the abutting faces (86, 93) are provided at a position at which the abutting faces (86, 93) overlap with the bolt (59) as viewed in the vehicle widthwise direction and are disposed on the opposite sides of the bolt (59) in the vehicle widthwise direction.

According to an embodiment of the present invention, the abutting faces are provided at the position at which they overlap with the bolt as viewed in the vehicle widthwise direction and are disposed on the opposite sides of the bolt in the vehicle widthwise direction. Therefore, the axial force of the bolt can be received effectively on the opposite sides in the vehicle widthwise direction in the proximity of the bolt.

Further, according to an embodiment of the present invention, the handlebar fixing structure is configured such that the abutting faces (86, 93) are bent as viewed in an axial direction of the bolt (59).

According to an embodiment of the present invention, since the abutting faces are bent as viewed in an axial direction of the bolt, the rigidity of the abutting faces can be raised and the axial force of the bolt can be received effectively.

According to an embodiment of the present invention, the handlebar fixing structure is configured such that one of the first damper member (81) and the second damper member (82) includes a first female threaded portion (87a) wherein the bolt (59) for fixing the first clamper member (81) and the second damper member (82) to the handlebar post (60) is screwed and a second female threaded portion (84a) wherein a clamp bolt (76) for adjusting clamp load to the handlebar (30) is screwed, and a third female threaded portion (89a, 89b) for fixing a different part (96) to the handlebar damper (61) is provided at an upper portion of the one clamper member (81).

According to an embodiment of the present invention, since the plurality of female threaded portions are provided on one of the damper members, it is only necessary to perform machining of the female threaded portions only for one of the damper members, and the handlebar damper can be manufactured readily. Further, the different part can be provided above the steering system by a simple configuration making use of the third female threaded portions.

According to an embodiment of the present invention, the handlebar fixing structure is configured such that each of the handlebar post (60), the first clamper member (81) and the second clamper member (82) includes a pair of left and right parts with a hydraulic chamber (46a) of a steering damper apparatus (45) being disposed between the left and right handlebar posts (60).

According to an embodiment of the present invention, the steering damper apparatus can be provided making use of the space between the left and right handlebar posts.

According to an embodiment of the present invention, the handlebar fixing structure is configured such that the hydraulic chamber (46a) is disposed below the handlebar (30).

According to an embodiment of the present invention, the steering damper apparatus can be provided making use of the space below the handlebar.

Further, according to an embodiment of the present invention, the handlebar fixing structure is configured such that the handlebar damper (61) includes a lower fixing portion (75) fastened by the bolt (59) and fixed to the handlebar post (60), an upper fixing portion (77) to which a clamp bolt (76) for adjusting clamp load to the handlebar (30) is fastened, and a handlebar fixing portion (78) provided between the upper fixing portion (77) and the lower fixing portion (75) and sandwiching the handlebar (30). The elastic member (72) is fitted with the bolt (59) and provided on the inner side of the lower fixing portion (75) while the abutting faces (86, 93) are provided on the lower fixing portion (75).

According to an embodiment of the present invention, the handlebar clamper can be elastically supported on the handlebar posts through the elastic members provided on the lower fixing portion of the handlebar damper extending upwardly and downwardly, and the handlebar can be fixed to the handlebar fixing portion above the lower fixing portion. Consequently, the clamp load can be adjusted readily by the upper fixing portion.

According to an embodiment of the present invention, there is provided a steering damper fixing structure for a saddle type vehicle including a steering system (35) for steerably supporting a front side traveling unit (2), which is attached for steering to a front portion of a vehicle body. A handlebar (30) is attached above the steering system (35) and extends in a vehicle widthwise direction with a pair of left and right handlebar posts (60) supported above the steering system (35) for supporting the handlebar (30) thereon. A steering damper apparatus (45) includes a hydraulic chamber (46a) supported for integral pivotal motion with the steering system (35) at a position between the left and right handlebar posts (60) at which the hydraulic chamber (46a) overlaps with the handlebar (30) as viewed from a steering shaft direction, wherein the hydraulic chamber (46a) is fastened to the steering system (35) by a bolt (53) directed in a forward and rearward direction.

According to an embodiment of the present invention, since the hydraulic chamber is fastened to the steering system by the bolt directed in the forward and rearward direction, a part which is positioned above the handlebar or the steering damper apparatus does not interfere with a tool path for the bolt directed in the forward and rearward direction. Therefore, the maintainability of the steering damper fixing structure and the degree of freedom in disposition of a different part can be improved.

Further, according to an embodiment of the present invention, the steering damper fixing structure is configured such that the pair of left and right handlebar posts (60) are configured independently of each other, the hydraulic chamber (46a) is fixed to a damper stay (47) fixed to and supported on each of the left and right handlebar posts (60), and the damper stay (47) is fastened to the handlebar posts (60) by the bolt (53) directed in the forward and rearward direction.

According to an embodiment of the present invention, even where the distance between the left and right handlebar posts is changed, if only the damper stay is changed in accordance with the change, then the hydraulic chamber can be fixed. Therefore, it is possible to easily cope with a change in setting of the left and right handlebar posts.

Furthermore, according to an embodiment of the present invention, the steering damper fixing structure is configured such that each of the handlebar posts (60) includes a post (64) for supporting the handlebar (30) at an upper portion of the handlebar posts (60) with a base unit (63) configured independently of the post (64) on a lower side of the post (64). A bracket portion (67) to which the hydraulic chamber (46a) is fastened is provided on the base unit (63) and the base unit (63) is fastened together with the post to the steering system (35).

According to an embodiment of the present invention, since the posts has a function for supporting the handlebar and the bracket portions has a function for supporting the hydraulic chamber are separated from each other, it is possible to cope with a change in shape of the handlebar and the hydraulic chamber individually. Therefore, the degree of freedom to change the setting is high.

According to an embodiment of the present invention, the steering damper fixing structure is configured such that the bolt (53) directed in the forward and rearward direction is disposed substantially in parallel to an upper face of a top bridge (36) of the steering system (35).

According to an embodiment of the present invention, since the bolt directed in the forward and rearward direction is disposed substantially in parallel to the upper face of the top bridge of the steering system, the bolt directed in the forward and rearward direction can be mounted and dismounted readily making use of the space along the upper face of the top bridge.

With the handlebar fixing structure according to an embodiment of the present invention, the handlebar fixing structure can be obtained which allows the handlebar to be attached to a high position with a high vibration absorbency.

Further, the axial force of the bolt can be received effectively on the opposite sides in the vehicle widthwise direction in the proximity of the bolt.

Further, the rigidity of the abutting faces can be raised, and the axial force of the bolt can be received effectively.

Furthermore, the handlebar clamper having the female threaded portion can be manufactured readily, and a different part can be provided above the steering system by a simple configuration.

Further, the steering damper apparatus can be provided making use of the space between the left and right handlebar posts.

Further, the steering damper apparatus can be provided making use of the space below the handlebar.

Further, the handlebar damper can be elastically supported on the handlebar post through the elastic members provided on the lower fixing portion of the handlebar clamper, and the handlebar can be fixed to the handlebar fixing portion. Consequently, the clamp load can be adjusted readily by the upper fixing portion.

Further, the maintainability of the steering damper fixing structure and the degree of freedom in disposition of a different part can be improved.

Further, it is possible to easily cope with a change in setting of the left and right handlebar posts.

Furthermore, it is possible to cope with a change in shape of the handlebar and the hydraulic chamber individually, and the degree of freedom to change the setting is high.

Further, the bolt directed in the forward and rearward direction can be mounted and dismounted readily making use of the space along the upper face of the top bridge.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
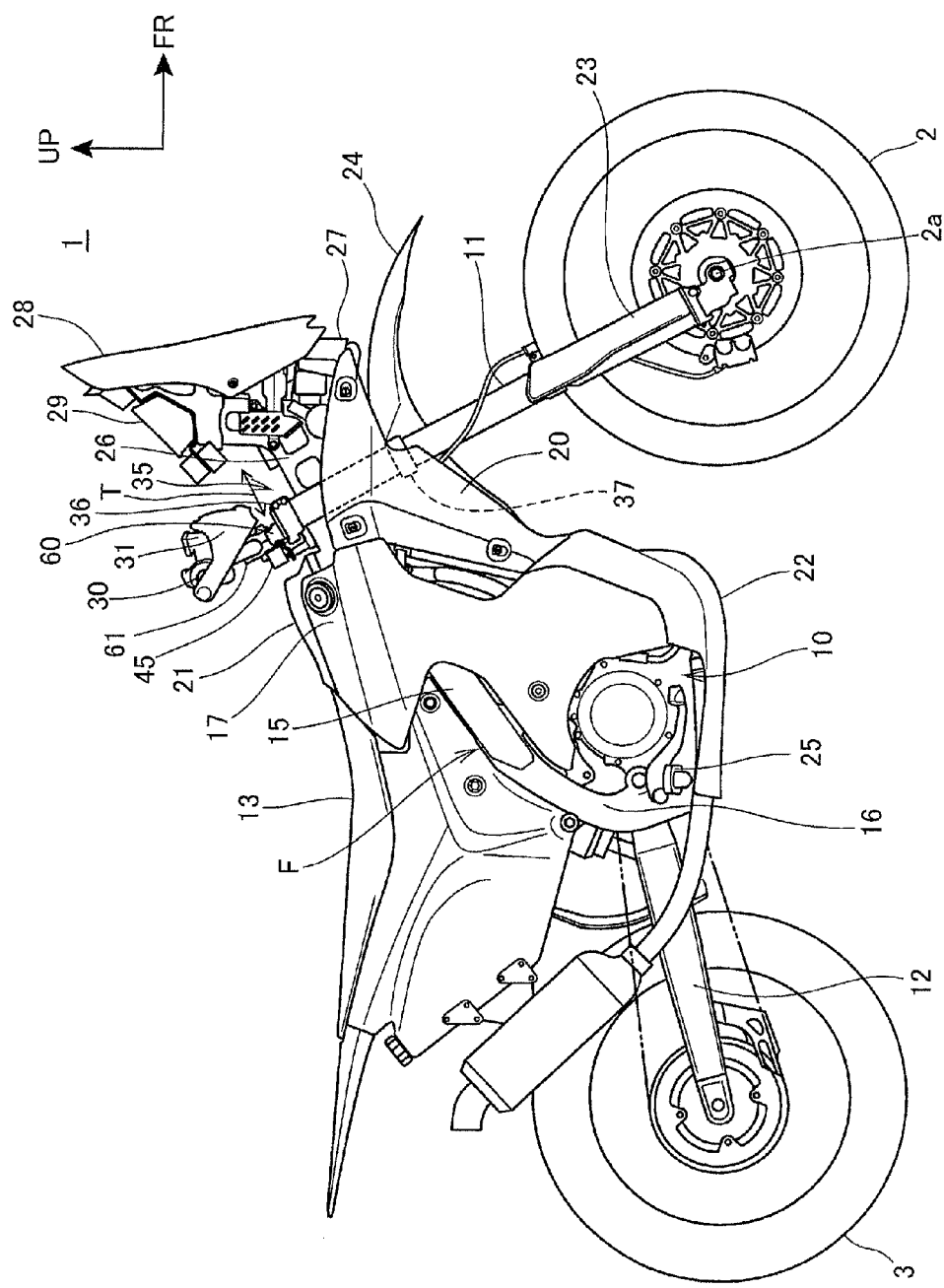
FIG. 1 is a right side elevational view of a motorcycle according to an embodiment of the present invention.

In the following, an embodiment of the present invention is described with reference to the drawings. It is to be noted that, unless otherwise specified, representations of directions such as forward, rearward, leftward, rightward, upward and downward directions are the same as the directions as viewed from a vehicle body. Further, reference characters FR, UP and LH depicted in the drawings indicate the forward direction, upward direction and leftward direction of the vehicle body, respectively.

FIG. 1 is a right side elevational view of a motorcycle 1 according to an embodiment of the present invention. It is to be noted that, where left and right members are provided in a pair, only the right one of the members is depicted in FIG. 1.

The motorcycle 1 is a vehicle in which an engine 10 as a power unit is supported on a vehicle body frame F and a pair of left and right front forks 11 are steerably supported at a front end of the vehicle body frame F. A front wheel 2 (front side traveling unit) is supported on the front forks, and a swing arm 12 is provided at a rear portion of the vehicle body frame F for supporting a rear wheel 3 thereon. The motorcycle 1 is a saddle type vehicle wherein a seat 13 is provided above a central portion in the forward and rearward direction of the vehicle body frame F such that an occupant is to sit astride thereon.

The vehicle body frame F includes a head pipe 14 (FIG. 3), a pair of left and right main frames 15, a pair of left and right pivot frames 16, a down frame (not depicted), and an under frame (not depicted). The head pipe 14 is provided at a front end of the vehicle body frame F. The left and right main frames 15 extend in a rearwardly obliquely downwardly inclined relationship from the head pipe 14. The left and right pivot frames 16 extend downwardly from a rear end of the main frame 15. The down frame extends rearwardly downwardly from a rear face of a lower portion of the head pipe 14. The under frame extends downwardly in a leftwardly and rightwardly branching relationship from the down frame and is bent substantially horizontally in a rearward direction and then coupled with a lower end of the pivot frames 16.

A fuel tank 17 is disposed in front of the seat 13 and extends upwardly and downwardly along the left and right sides of the main frames 15.

The motorcycle 1 includes a vehicle body cover made of resin. The vehicle body cover includes a pair of left and right shrouds 20, a tank cover 21, an undercover 22, and a pair of left and right fork covers 23. The left and right shrouds 20 cover an upper portion of the front forks 11 and the down frame from the side. The tank cover 21 covers the fuel tank 17 from the upper side. The undercover 22 covers the under frame and the engine 10 from the lower side. The left and right fork covers 23 cover a lower portion of the front forks 11.

A front fender 24 is fixed to the front forks 11 and covers the front wheel 2 from the upper side.

A pair of left and right steps 25 are provided at a lower ends of the pivot frames 16 such that the occupant can place the feet thereof on the steps 25. A front stay 26 is fixed at a front portion of the head pipe 14 and projects forwardly with a headlamp 27, a windscreen 28, having a shape of a plate, and meters 29 are supported on the front stay 26.

A handlebar 30 is provided above the front forks 11 to permit the occupant to steer the front wheel 2. The opposite ends of the handlebar 30 in the vehicle widthwise direction are covered with handlebar covers 31 from the front side.

Figure 2:
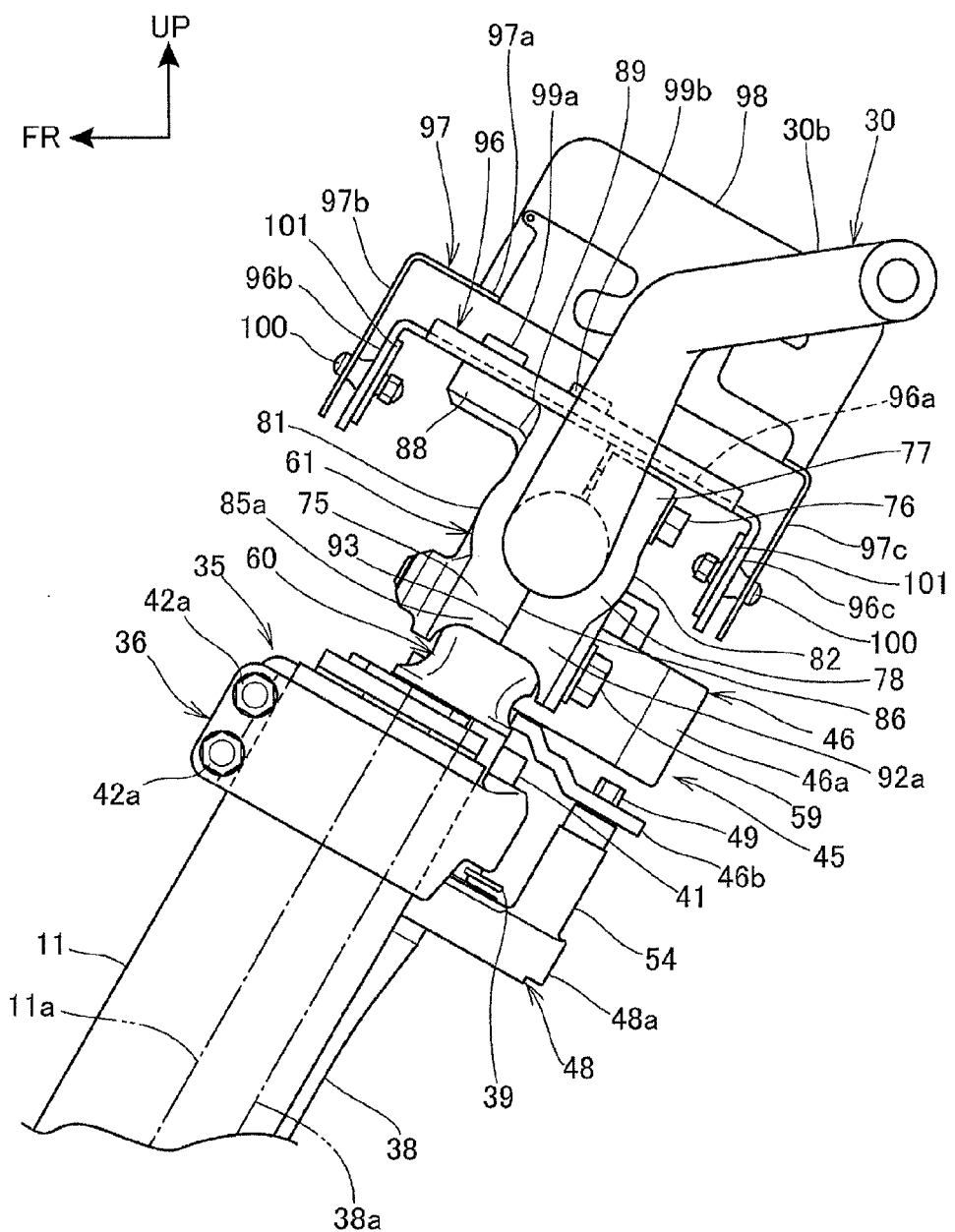
FIG. 2 is a left side elevational view of a fixing structure for a handlebar.
Figure 3:
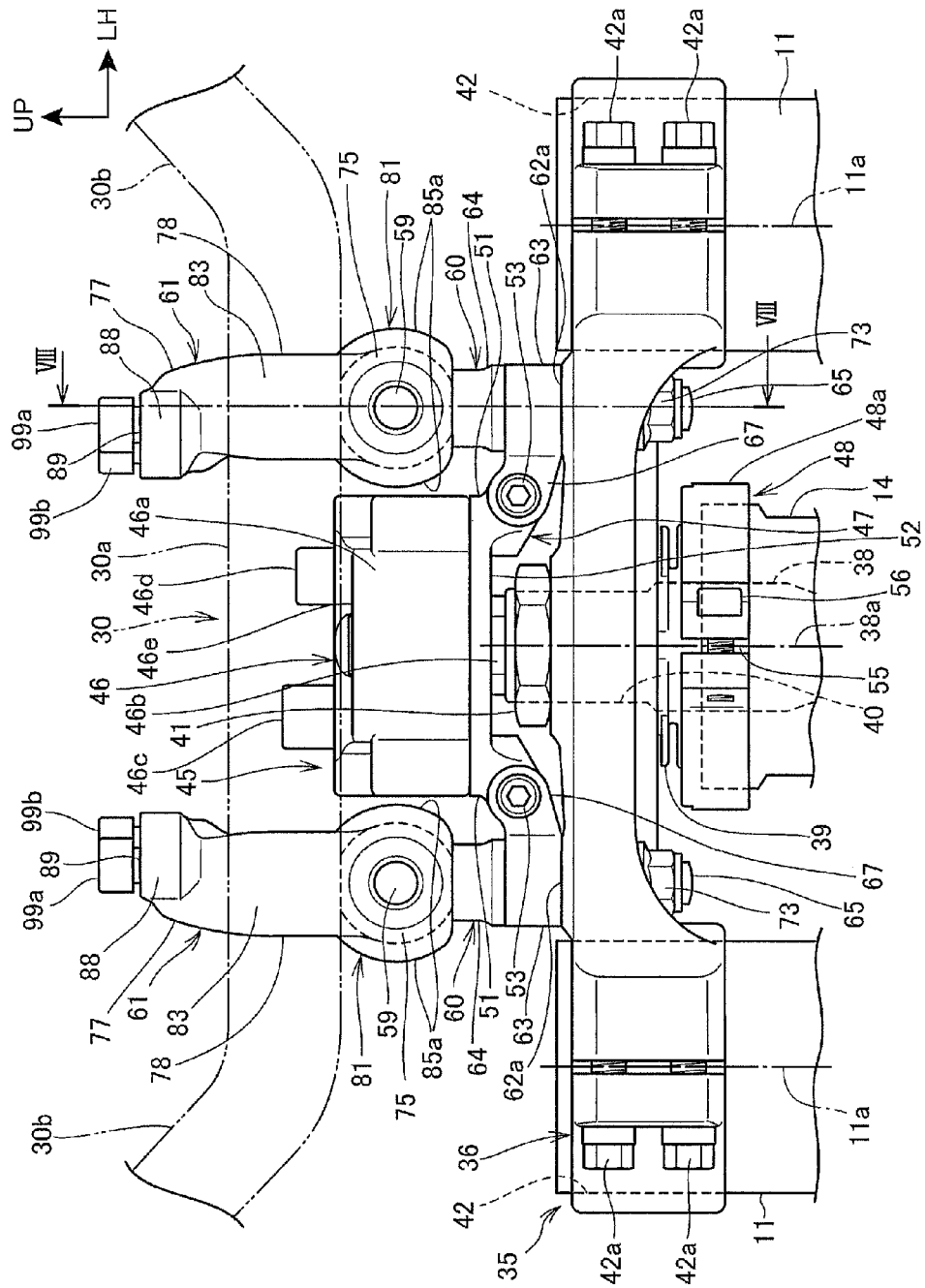
FIG. 3 is a view of the fixing structure for the handlebar as viewed from the front side in a bolt fastening direction.
Figure 4:
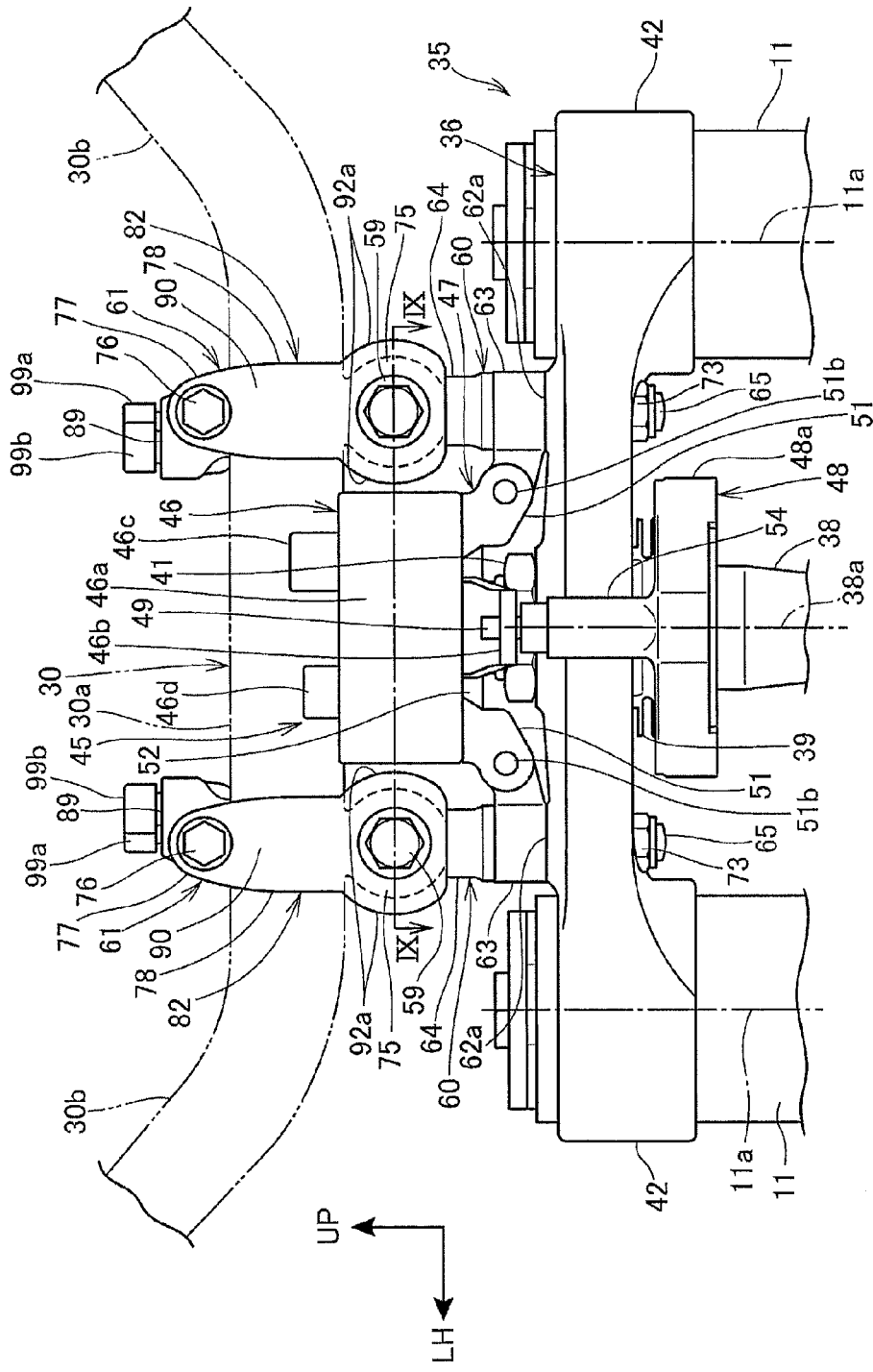
FIG. 4 is a view of the fixing structure for the handlebar as viewed from the rear side in the bolt fastening direction.

FIG. 2 is a left side elevational view of a fixing structure for the handlebar 30. FIG. 3 is a view of the fixing structure for the handlebar 30 as viewed from the front side in a bolt fastening direction. FIG. 4 is a view of the fixing structure for the handlebar 30 as viewed from the rear side in the bolt fastening direction. It is to be noted that the head pipe 14 is depicted only in FIG. 3. Further, a bracket 96 hereinafter described is depicted only in FIG. 2.

As depicted in FIGS. 1 to 4, a steering system 35 for steerably supporting the front wheel 2 on the head pipe 14 includes the front forks 11, a top bridge 36, a bottom bridge 37 (FIG. 1), and a steering shaft 38. The top bridge 36 couples upper end portions of the front forks 11 with each other in the vehicle widthwise direction. The bottom bridge 37 couples intermediate portions in the upward and downward direction of the front forks 11 with each other in the vehicle widthwise direction. The steering shaft 38 is supported for rotation in the head pipe 14. The head pipe 14 is positioned at the center in the vehicle widthwise direction.

A predetermined caster angle is set to the steering system 35, and the head pipe 14 is disposed in a rearwardly inclined relationship in accordance with the caster angle. Also an axial line 38a of the steering shaft 38 and axial lines 11a of the front forks 11 are provided substantially in parallel to the head pipe 14 and are inclined rearwardly.

The steering shaft 38 extends upwardly from a central portion of the bottom bridge 37 and is inserted from below in the head pipe 14. The top bridge 36 is coupled with an upper end portion of the head pipe 14 which projects upwardly as depicted in FIG. 3. More particularly, the steering shaft 38 is supported for rotation on the head pipe 14 by a pair of bearings (not depicted) provided at an upper end and a lower end of the inside of the head pipe 14. A nut 39 is fastened to an upper end portion of the steering shaft 38 and presses the bearing on the upper end side in the axial direction.

The top bridge 36 is formed in the form of a plate elongated in the vehicle widthwise direction rather than in the forward and rearward direction, and has a shaft hole 40 provided at a central portion of the top bridge 36 in the vehicle widthwise direction. The top bridge 36 is supported on the nut 39 by an upper end portion of the steering shaft 38 fitted in the shaft hole 40 thereof. The top bridge 36 is fixed to the steering shaft 38 by a top nut 41 fastened to an upper end of the steering shaft 38 which projects upwardly from the shaft hole 40.

Each of the top bridge 36 and the bottom bridge 37 has a pair of fork supporting hole portions 42 (the hole portions 42 of the bottom bridge 37 are not depicted) provided at the opposite end portions thereof in the vehicle widthwise direction. The front forks 11 are inserted in the fork supporting hole portions 42. The front forks 11 are fixed by fork fixing bolts 42a which reduce the diameter of the fork supporting hole portions 42 and are tightened therebetween.

The front wheel 2 is supported for rotation on an axle 2a (FIG. 1) provided at a lower end of the front forks 11.

The occupant would grip and operate the handlebar 30 to pivot the steering system 35 around the steering shaft 38. The handlebar 30 has a straight portion 30a extending straightly in the vehicle widthwise direction, and a pair of extensions 30b bent rearwardly upwardly from the straight portion 30a and extending to the outer sides in the vehicle widthwise direction.

A steering damper apparatus 45 is provided in a space between the handlebar 30 and top bridge 36 and attenuates a pivotal motion of the steering system 35.

Figure 5:
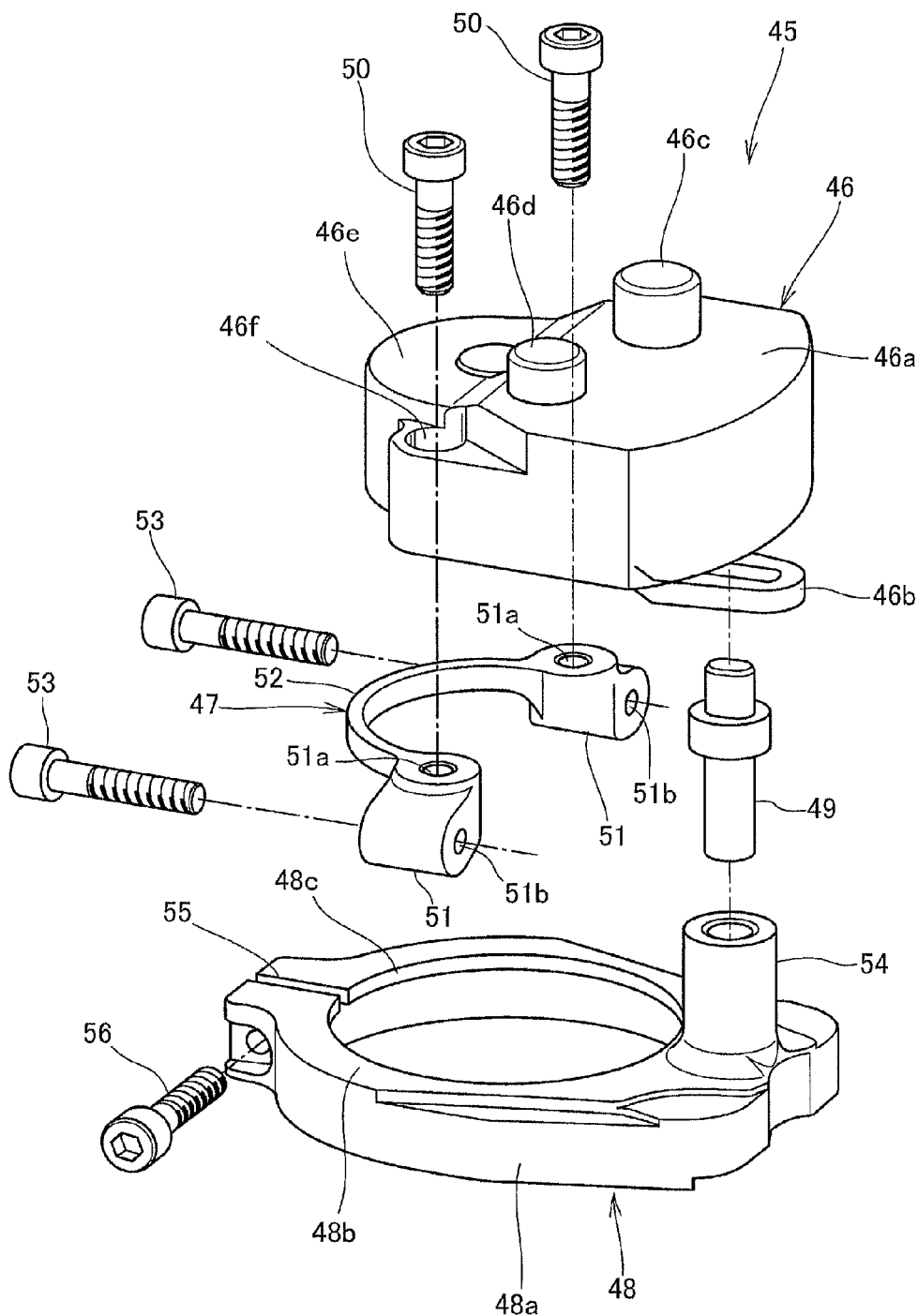
FIG. 5 is an exploded perspective view of a steering damper apparatus.

FIG. 5 is an exploded perspective view of the steering damper apparatus 45.

Referring to FIGS. 2 to 5, the steering damper apparatus 45 includes a damper apparatus main body 46 of the hydraulic type, a damper stay 47, a vehicle body side fixing member 48 and a pin 49. The damper stay 47 is attached to a lower face of the damper apparatus main body 46. The vehicle body side fixing member 48 is fixed to the head pipe 14. The pin 49 is provided uprightly on the vehicle body side fixing member 48.

The damper apparatus main body 46 includes a substantially box-shaped case 46a having a hydraulic chamber in the inside thereof, and an arm 46b provided in the hydraulic chamber and pivotally movable in an interlocking relationship with a movable member (not depicted) which moves against the hydraulic pressure. The arm 46b extends from a pivot shaft 46g (FIG. 11) projecting from a central portion of a lower face of the case 46a toward the rear side of the vehicle and pivots around the pivot shaft 46g. In addition, the damper apparatus main body 46 includes operation portions 46c and 46d provided on an upper face of the case 46a for adjusting the attenuation force and so forth. The case 46a includes a stepped portion 46e provided at a front portion thereof with an upper face recessed by one stage. Further, a pair of fixing hole portions 46f are provided at left and right end portions of a front portion of the case 46a, and a pair of case fixing bolts 50 are fitted in the fixing hole portions 46f and fasten the case 46a to the damper stay 47.

The damper stay 47 includes a pair of fastening portions 51 of a shape of a block fixed to a lower face of the fixing hole portions 46f of the case 46a and a connection portion 52 for connecting the fastening portions 51 to each other in the vehicle widthwise direction. The connection portion 52 is formed in an arcuate shape projected toward the front side so as not to interfere with a front end portion of the arm 46b.

Each of the fastening portions 51 has a female threaded portion 51a to which a case fixing bolt 50 is fastened, and an outer side female threaded portion 51b provided on the outer side of the female threaded portion 51a in the vehicle widthwise direction. The outer side female threaded portion 51b is a threaded hole extending in the forward and rearward direction of the vehicle. A pair of stay fixing bolts 53 (bolts directed in the forward and rearward direction) are fastened to the outer side female threaded portions 51b to fix the damper stay 47 to the top bridge 36 side.

The vehicle body side fixing member 48 has an outer circumferential portion 48a, a flange portion 48b and a hole 48c. The outer circumferential portion 48a is fitted with an outer periphery of an upper end portion of the head pipe 14. The flange portion 48b extends toward the inner side from an upper edge of the outer circumferential portion 48a and contacts with an upper face of the head pipe 14. The steering shaft 38 and the nut 39 pass through the hole 48c. The vehicle body side fixing member 48 has a boss portion 54 provided at a rear portion thereof and projecting upwardly, and the pin 49 is fixed to the boss portion 54. The vehicle body side fixing member 48 is formed in such a split clamp type that an open portion 55 extending in a diametrical direction is provided at a front end portion of the vehicle body side fixing member 48. A split fastening bolt 56 is provided at a front end portion of the vehicle body side fixing member 48 and is fastened so as to close the open portion 55.

The vehicle body side fixing member 48 is disposed such that a lower face of the flange portion 48b thereof abuts an upper face of the head pipe 14. The vehicle body side fixing member 48 is fixed to the head pipe 14 such that the outer circumferential portion 48a thereof holds the head pipe 14 by fastening force of the split fastening bolt 56. The vehicle body side fixing member 48 is mounted against rotation on the head pipe 14 and does not rotate.

A rear portion of the vehicle body side fixing member 48 projects rearwardly from below the top bridge 36, and the pin 49 extends upwardly along a rear face of the top bridge 36.

The damper apparatus main body 46 is fixed above the top bridge 36 and rotates together with the steering system 35. The arm 46b of the damper apparatus main body 46 projects rearwardly from above the top bridge 36, and the pin 49 is coupled at an upper end thereof with a rear end portion of the arm 46b. The arm 46b can pivotally move around the pin 49.

When the steering system 35 pivotally moves, the pivotal motion of the arm 46b is attenuated by the hydraulic pressure in the case 46a. The pivotal motion of the steering system 35 is attenuated thereby.

As depicted in FIGS. 2 to 4, the handlebar fixing structure for fixing the handlebar 30 to the top bridge 36 includes a pair of left and right handlebar posts 60, and a pair of left and right handlebar dampers 61. The handlebar posts 60 are fixed to an upper face of the top bridge 36. The handlebar clampers 61 are fixed to the handlebar posts 60 and support the handlebar 30 thereon. The handlebar posts 60 and the handlebar dampers 61 are fixedly fastened to each other by fixing bolts 59 (bolts) which are fitted in the handlebar posts 60 and the handlebar dampers 61 in the forward and rearward direction.

The handlebar posts 60 and the handlebar dampers 61 are disposed between the steering shaft 38 and the left and right front forks 11, respectively.

Figure 6:
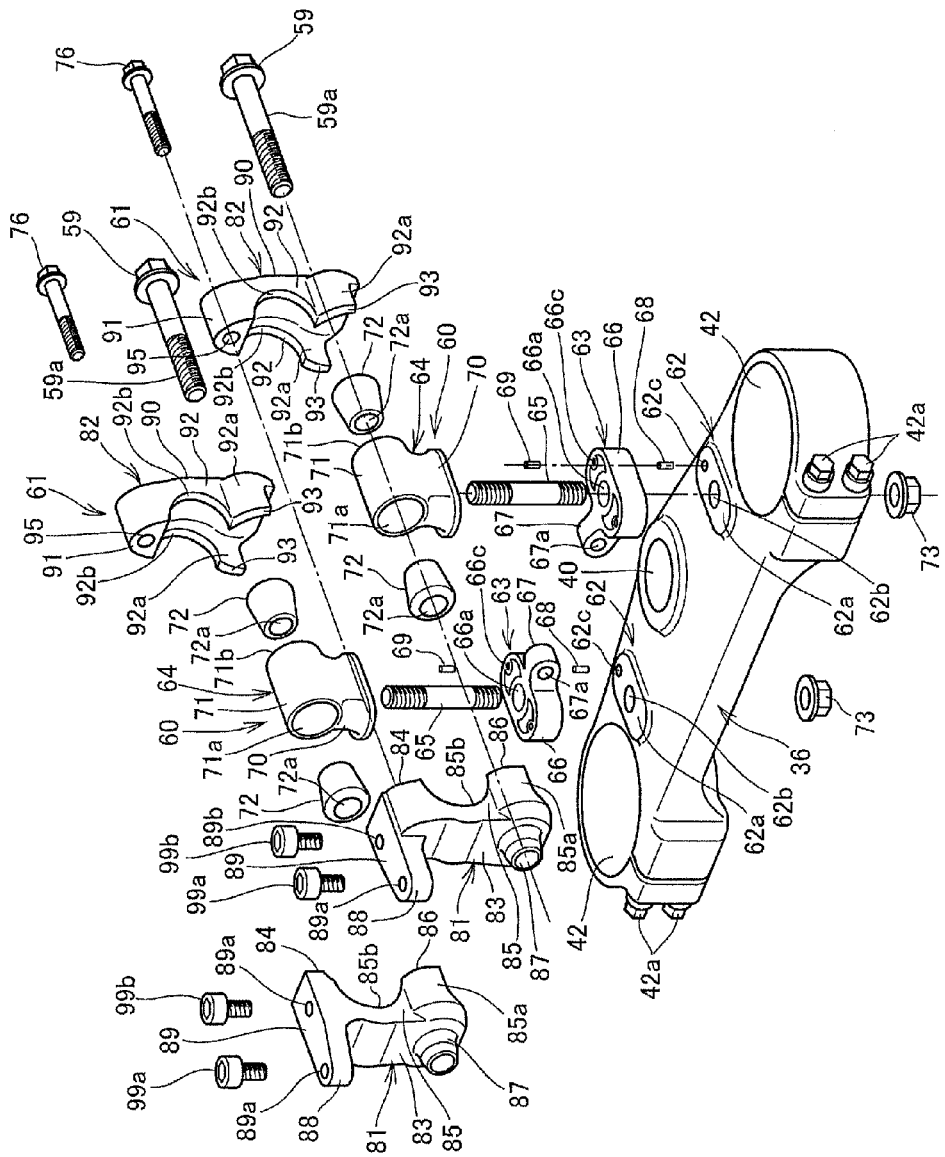
FIG. 6 is an exploded perspective view of a handlebar post and a handlebar clamper.
Figure 7:
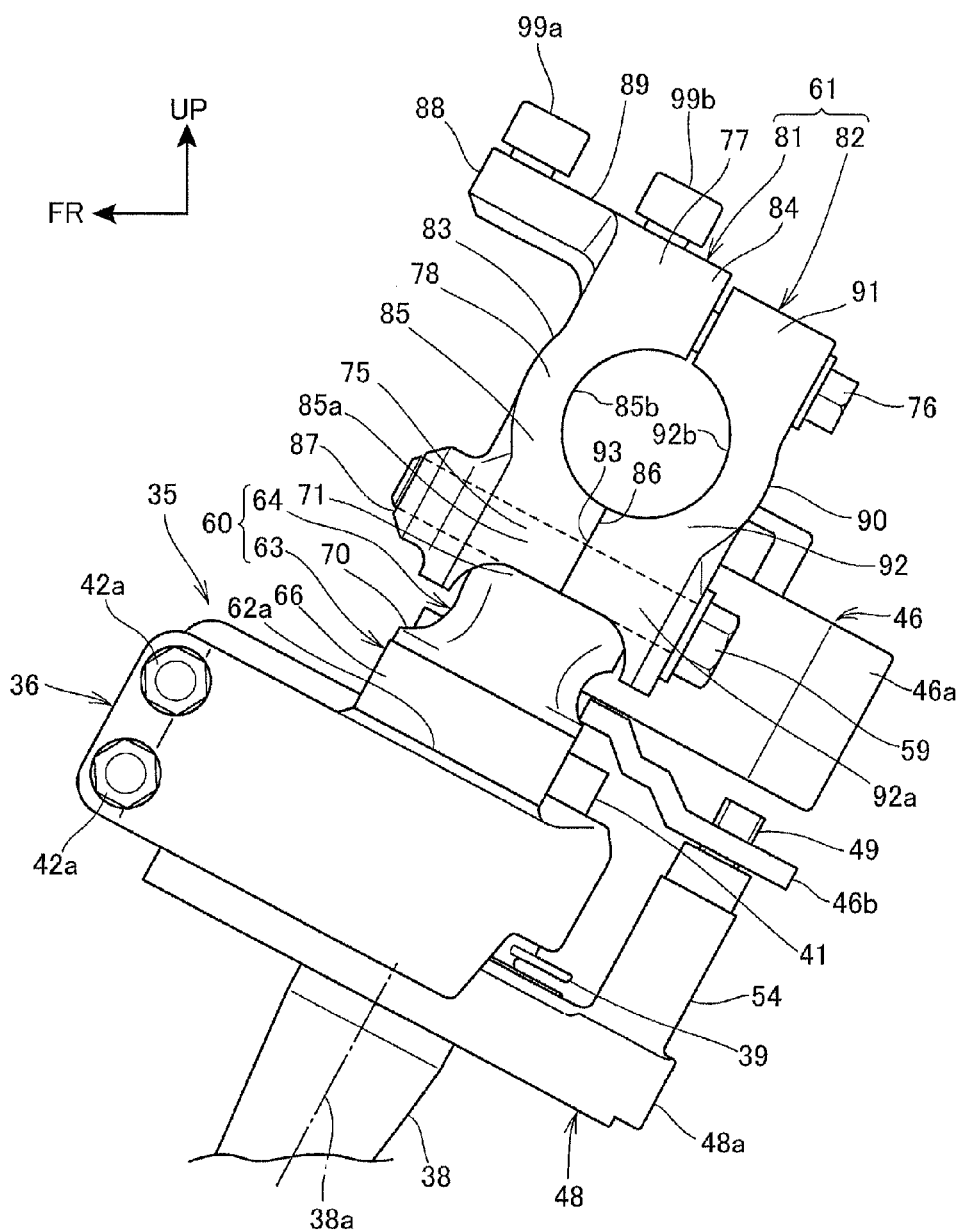
FIG. 7 is a left side elevational view of an upper portion of the handlebar fixing structure.
Figure 8:
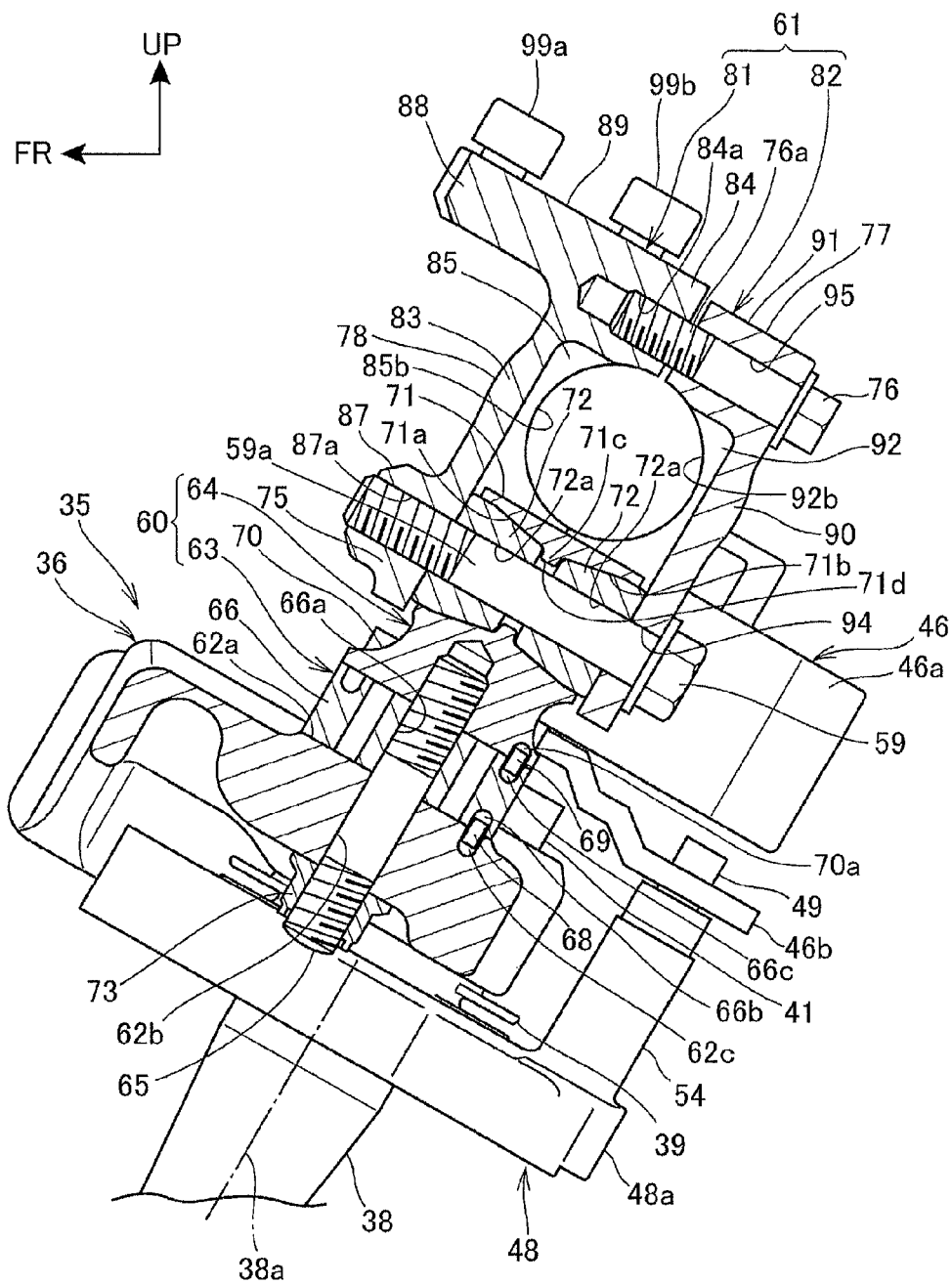
FIG. 8 is a sectional view taken along line VIII-VIII of FIG. 3.

FIG. 6 is an exploded perspective view of the handlebar posts 60 and the handlebar clampers 61. FIG. 7 is a left side elevational view of an upper portion of the handlebar fixing structure. FIG. 8 is a sectional view taken along line VIII-VIII of FIG. 3. In FIGS. 7 and 8, the handlebar 30, front forks 11, head pipe 14 and so forth are not depicted.

As depicted in FIG. 6, the top bridge 36 includes a pair of handlebar post fixing portions 62 disposed between the shaft hole 40 and the left and right fork supporting hole portions 42 and having the handlebar posts 60 fixed thereto. Each of the handlebar post fixing portions 62 includes a flat face 62a elongated forwardly and rearwardly, a hole 62b provided at the center of the flat face 62a, and a pin hole 62c provided at a rear portion of the flat face 62a.

Referring to FIGS. 6 to 8, each of the handlebar posts 60 includes a base 63 (base portion), a post 64, and a post fixing bolt 65. The base 63 is fixed to the flat face 62a of a handlebar post fixing portion 62, and the post 64 is connected to an upper face of the base 63 and supports a handlebar damper 61 thereon. The post fixing bolt 65 projects downwardly from the base 63 and is inserted in the hole 62b.

Each of the bases 63 includes a base main body 66 of a block shape elongated forwardly and rearwardly, and a bracket portion 67 (FIG. 6) projecting inwardly from a central portion of the base main body 66 in the forward and backward direction. The base main body 66 has a hole 66a provided at a central portion thereof in the forward and rearward direction and has a pin hole 66b provided on a lower face of a rear portion thereof. The post fixing bolt 65 is fitted in the hole 66a, and a pin 68 for positioning the base 63 is fitted in the pin hole 66b. Further, the base main body 66 has a pin hole 66c provided on an upper face of a rear portion thereof, and a pin 69 for positioning the post 64 is fitted in the pin hole 66c. The bracket portion 67 has a bolt hole 67a in which a stay fixing bolt 53 (FIG. 5) is inserted.

The post 64 is formed in a shape of a block and has an abutting portion 70 provided at a lower portion thereof so as to contact with an upper face of the base main body 66. Further, the post 64 has a cylindrical portion 71 (end portion of the handlebar post) provided at an upper portion thereof and extending forwardly and rearwardly.

To a front portion and a rear portion of the cylindrical portion 71, a pair of elastic members 72 of a substantially cylindrical shape are attached. More particularly, the elastic members 72 are made of rubber and are formed in a shape of a circular truncated cone and have a bolt hole 72a provided at the center thereof and extending therethrough in the axial direction.

The cylindrical portion 71 has a front side accommodation portion 71a provided at a front portion thereof for accommodating the front side elastic member 72 therein and has a rear side accommodation portion 71b provided at a rear portion thereof for accommodating the rear side elastic member 72 therein. An annular receiving portion 71c is formed at a central portion of the cylindrical portion 71 in the forward and rearward direction and projects to the inner side in a diametrical direction. The front side accommodation portion 71a and the rear side accommodation portion 71b are partitioned by the receiving portion 71c. An inner circumferential portion of the receiving portion 71c defines a hole 71d through which a fixing bolt 59 extends.

The front side accommodation portion 71a and the rear side accommodation portion 71b have an inner circumferential face that is inclined such that the diameter thereof decreases toward the receiving portion 71c side. The elastic members 72 are fitted in the front side accommodation portion 71a and the rear side accommodation portion 71b such that tip end portions thereof having a smaller diameter are abutted with the receiving portion 71c. The elastic members 72 project outwardly in the axial direction from the front and rear ends of the cylindrical portion 71 in a natural state of the elastic members 72 in which they are not compressed.

The abutting portion 70 of each of the posts 64 has a pin hole 70a provided on a lower face of a rear portion thereof, and the pin 69 is fitted in the pin hole 70a.

Each of the post fixing bolts 65 is a stud bolt which is coupled to a lower face of the abutting portion 70 of the post 64.

The posts 64 and the bases 63 are integrated by fitting the post fixing bolt 65 in the hole 66a of the base 63. The post fixing bolt 65 is fitted in the hole 62b and projects downwardly of the top bridge 36, and a post fixing nut 73 is fastened to a lower end portion of the post fixing bolt 65. The handlebar post 60 is fixed thereby to the top bridge 36. In other words, the post 64 and the base 63 are fastened together by the post fixing bolt 65. Further, the base 63 and the post 64 are positioned by the pins 68 and 69, respectively.

Figure 9:
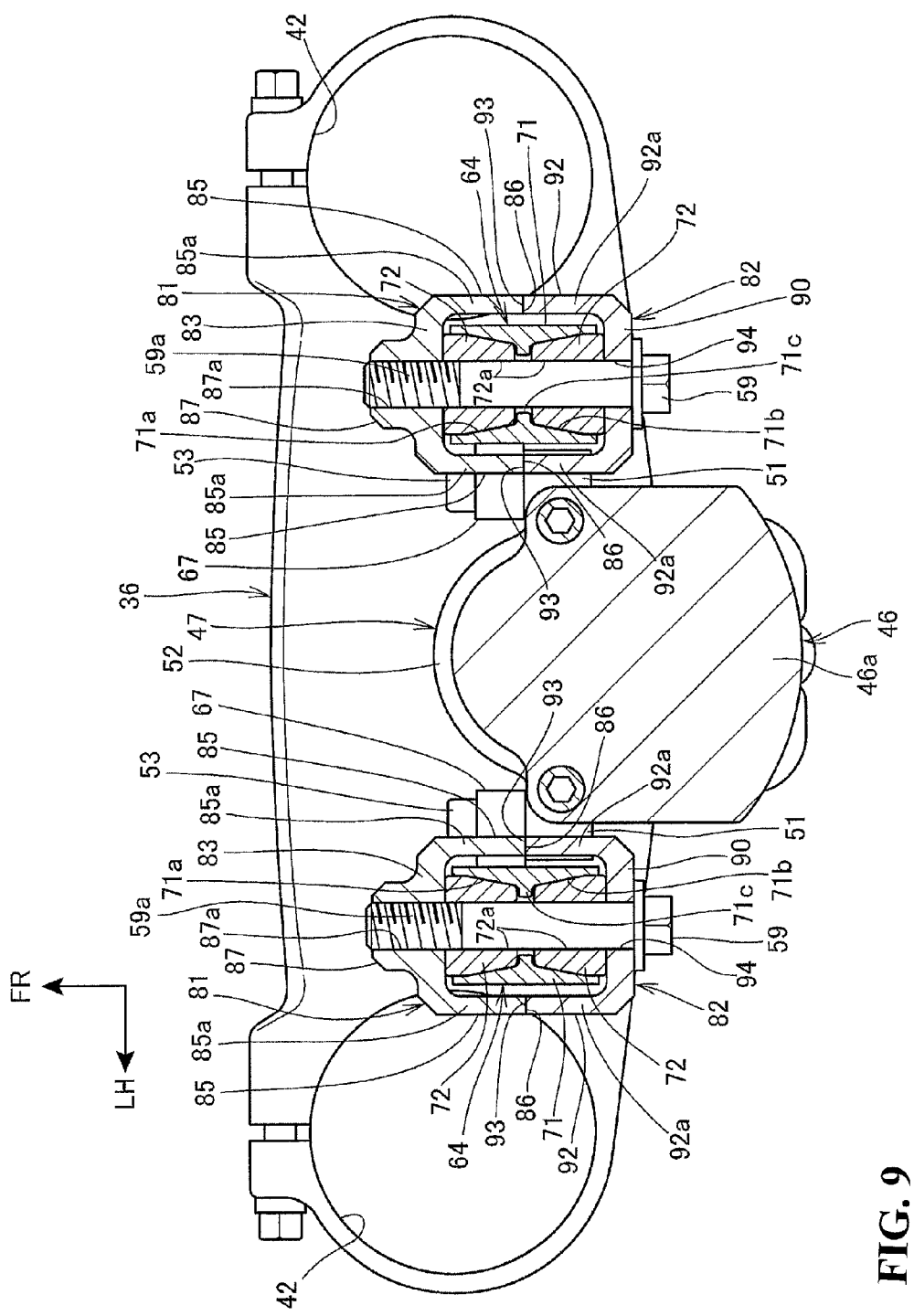
FIG. 9 is a sectional view taken along line IX-IX of FIG. 4.

FIG. 9 is a sectional view taken along line IX-IX of FIG. 4.

Referring to FIGS. 6 to 9, each of the handlebar clampers 61 is formed in a hollow tubular shape elongated in the upward and downward direction. The handlebar damper 61 has a lower fixing portion 75, an upper fixing portion 77, and a handlebar fixing portion 78. The lower fixing portion 75 is fastened by the fixing bolt 59 and fixed to the handlebar post 60. The upper fixing portion 77 has a clamp bolt 76 fastened thereto for adjusting the clamp load to the handlebar 30. The handlebar fixing portion 78 is provided between the upper fixing portion 77 and the lower fixing portion 75 and sandwiches the handlebar 30.

Each of the handlebar dampers 61 is configured from two parts split forwardly and rearwardly and includes a first clamper member 81 configuring the front side half and a second damper member 82 configuring the rear side half.

The first damper member 81 includes a front wall portion 83, a front side boss portion 84, and a pair of side walls 85. The front wall portion 83 configures a front face of the handlebar damper 61. The front side boss portion 84 is provided uprightly to the rear side from an upper end portion of the front wall portion 83. The side walls 85 are provided uprightly to the rear side from left and right side edges of the front wall portion 83. The first damper member 81 is formed such that the inner side space thereof is open rearwardly and downwardly.

The side walls 85 are contiguous at an upper end thereof to left and right side edges of a lower face of the front side boss portion 84, and lower ends of the side walls 85 are positioned at lower end portions of the first damper member 81.

An abutting wall portion 85a is formed at a lower portion of each of the side walls 85 and contacts with the second clamper member 82 side. The abutting wall portions 85a are formed in a thin plate having a cross section which is curved in an arc swelling sidewardly in accordance with the cylindrical portion 71 accommodated inside the abutting wall portions 85a. A rear end face of each of the abutting wall portions 85a is an abutting face 86 which abuts with the second clamper member 82. The abutting faces 86 are formed so as to be curved in an arc.

Each of the side walls 85 has a front side handlebar supporting portion 85b provided at an upper portion thereof The front side handlebar supporting portion 85b is cut out in a semicircular shape in accordance with the shape of the straight portion 30a of the handlebar 30.

A boss 87 is provided at a lower portion of the front wall portion 83 and projects forwardly. A first female threaded portion 87a is formed on the boss 87, and the fixing bolt 59 is fastened to the first female threaded portion 87a.

A second female threaded portion 84a is formed on the front side boss portion 84, and the clamp bolt 76 is fastened to the second female threaded portion 84a.

Each of the first clamp members 81 has an extension 88 in the form of a plate provided at an upper end thereof, and the extension 88 projects forwardly farther than the front wall portion 83. An upper face 89 of the first damper member 81 including an upper face of the extension 88 is formed as a flat face extending substantially in parallel to an upper face of the top bridge 36. A pair of third female threaded portions 89a and 89b are formed on the upper face 89.

Each of the second clamper members 82 includes a rear wall portion 90, a rear side boss portion 91 and a pair of side walls 92 and is formed such that the inside space thereof is open forwardly and downwardly. The rear wall portion 90 configures a rear face of the handlebar damper 61. The rear side boss portion 91 is provided uprightly to the front side from an upper end portion of the rear wall portion 90. The side walls 92 are provided uprightly to the front side from left and right side edges of the rear wall portion 90.

The side walls 92 are contiguous at an upper end thereof to left and right side edges of a lower face of the rear side boss portion 91, and lower ends of the side walls 92 are positioned at lower end portions of the second clamper member 82.

Each of the side walls 92 has an abutting wall portion 92a formed at a lower portion thereof, and the abutting wall portion 92a abuts with the first clamper member 81 side. The abutting wall portions 92a are formed so as to be curved in an arc swelling sidewardly in accordance with the cylindrical portion 71 accommodated on the inner side of the abutting wall portions 92a. A front end face of each of the abutting wall portions 92a is an abutting face 93 which abuts with the abutting face 86 of the first clamper member 81, and also the abutting faces 93 are formed so as to be curved in an arc. The abutting faces 86 and the abutting faces 93 are provided, as viewed in the vehicle widthwise direction (as viewed in side elevation), at a position at which they overlap with a shank 59a of the fixing bolt 59.

A rear side handlebar supporting portion 92b is provided at an upper portion of each of the side walls 92 and is cut out in a semicircular shape in accordance with the shape of the straight portion 30a of the handlebar 30.

A hole 94 is provided at a lower portion of the rear wall portion 90, and the fixing bolt 59 is inserted in the hole 94. A hole 95 is formed on the rear side boss portion 91, and the clamp bolt 76 is inserted in the hole 95.

An example of a procedure for attaching the handlebar clamper 61 and the handlebar 30 to the handlebar post 60 is described hereinafter.

First, the first clamper member 81 and the second clamper member 82 are disposed such that they sandwich the elastic members 72 disposed on the cylindrical portion 71 of the handlebar post 60 from the front and the rear, respectively. Thereupon, also the handlebar 30 is sandwiched between the front side handlebar supporting portion 85b and the rear side handlebar supporting portion 92b. The direction in which the first damper member 81 and the second damper member 82 sandwich the cylindrical portion 71 is a direction perpendicular to the vehicle widthwise direction. More particularly, the direction in which the first damper member 81 and the second clamper member 82 sandwich the cylindrical portion 71 is a direction substantially orthogonal to the axial line 38a of the steering shaft 38 as viewed in side elevation.

The fixing bolt 59 is inserted into the hole 94 from the rear side such that it extends through the cylindrical portion 71 and the elastic members 72 and is temporarily fixed to the first female threaded portion 87a. Also the clamp bolt 76 is inserted into the hole 95 from the rear side and temporarily fixed to the second female threaded portion 84a. The direction in which the fixing bolt 59 and the clamp bolt 76 are inserted is a direction substantially orthogonal to the axial line 38a of the steering shaft 38.

Thereafter, the fixing bolt 59 is tightened by predetermined torque. Consequently, an abutting state in which the abutting faces 86 and the abutting faces 93 abut with each other is established. In this abutting state, the axial force of the fixing bolt 59 is received by the abutting face 86 and the abutting face 93, and the distance between the inner face of the front wall portion 83 and the inner face of the rear wall portion 90 has a predetermined magnitude. Further, in the abutting state, the elastic members 72 are compressed in the axial direction in comparison with a natural state thereof by the inner face of the front wall portion 83 and the inner face of the rear wall portion 90. Further, in the abutting state, a gap is formed between the inner face of the front wall portion 83 and the front end of the cylindrical portion 71 and between the inner face of the rear wall portion 90 and the rear end of the cylindrical portion 71. Furthermore, the abutting face 86 and the abutting face 93 extend substantially in parallel to the axial line 38a of the steering shaft 38 as viewed in side elevation.

In the abutting state, the handlebar damper 61 sandwiches the cylindrical portion 71 through the elastic members 72 and the shank 59a of the fixing bolt 59 is connected to the cylindrical portion 71 through the elastic members 72. In particular, the handlebar clamper 61 is elastically supported on the handlebar post 60 through the elastic members 72. The elastic members 72 are hidden to the inner side of the handlebar damper 61 and are not exposed to the outside.

Thereafter, the clamp bolt 76 is tightened by a predetermined torque, whereby the clamp force to the handlebar 30 is adjusted and the handlebar 30 is fixed. Also in this state, a gap is formed between the front side boss portion 84 and the rear side boss portion 91.

In the present embodiment, since the handlebar 30 is fixed to the handlebar dampers 61 disposed so as to sandwich the cylindrical portions 71 at an upper end portion of the handlebar posts 60, the handlebar 30 can be attached at a high position. Further, since the elastic members 72 disposed on the cylindrical portions 71 are each sandwiched by the first clamper member 81 and the second damper member 82, the handlebar dampers 61 can be elastically supported by the elastic members 72 provided at a position higher than that of a base end portion of each of the handlebar posts 60. Consequently, the load to act upon the elastic members 72 from the handlebar 30 can be reduced in comparison with that by the configuration wherein an elastic member is provided at a base end portion of each handlebar post 60. Further, since the elastic members 72 which are comparatively soft can be used, they are liable to absorb vibration.

Further, the abutting face 86 and the abutting face 93 are formed so as to be curved in an arc along the outer shape of the cylindrical portion 71, and the abutting face 86 and the abutting face 93 have a curved shape as viewed in the axial direction of the fixing bolt 59. Therefore, while improvement in rigidity of the abutting face 86 and the abutting face 93 by the curved shape is achieved, the handlebar clamper 61 can be reduced in size.

Referring to FIGS. 3, 4, 6 and 9, the bracket portion 67 of the handlebar posts 60 extends toward the inner side in the vehicle widthwise direction. The damper apparatus main body 46 is disposed such that the fastening portions 51 of the damper stay 47 abut with the rear face of the bracket portions 67 and is fixed to the handlebar posts 60 by fastening the stay fixing bolts 53 inserted in the bolt holes 67a of the bracket portions 67 from the front side to the outer side female threaded portions 51b (FIG. 5).

In the present embodiment, since the handlebar 30 is attached to a high position spaced from the top bridge 36 by the handlebar dampers 61, a space can be assured between the center of the top bridge 36 and handlebar 30 and the top bridge 36, and the damper apparatus main body 46 can be disposed in the space. Thereupon, since the damper apparatus main body 46 is attached to the bracket portions 67 of the handlebar posts 60, the damper apparatus main body 46 can be attached by a simple structure.

As depicted in FIG. 2, the bracket 96 (a different part) is attached to the upper face 89 of the first clamp member 81. An attachment base 97 is attached to the bracket 96, and an electric part 98 is fixed to the attachment base 97.

The bracket 96 has a plate portion 96a extending forwardly and rearwardly along the upper face 89 and a pair of attachment plate portions 96b and 96c extending downwardly in a bent state from a front edge and a rear edge of the plate portion 96a, respectively.

The bracket 96 is fixed to the upper face 89 by bracket fixing bolts 99a and 99b fitted in the plate portion 96a. The bracket fixing bolts 99a and 99b are fastened to the third female threaded portions 89a and 89b (FIG. 6), respectively.

The attachment base 97 has an attachment portion 97a in the form of a plate to which the electric part 98 is attached, and a pair of leg portions 97b and 97c extend downwardly in a bent state from a front edge and a rear edge of the attachment portion 97a, respectively.

The attachment base 97 is fastened to the attachment plate portions 96b and 96c of the bracket 96 by base fixing bolts 100 inserted in the leg portions 97b and 97c. Each of the base fixing bolts 100 has a bracket anti-vibration member 101 provided thereon, and the attachment base 97 is elastically supported on the bracket 96.

The attachment portion 97a is disposed substantially in parallel to the upper face of the top bridge 36 and is inclined rearwardly so as to face the occupant side. The electric part 98 attached to the attachment portion 97a is, for example, a GPS unit, a meter, a camera, a navigation apparatus or the like. Since the attachment portion 97a is directed to the occupant side, the occupant can visually observe and operate the electric part 98 readily.

Figure 10:
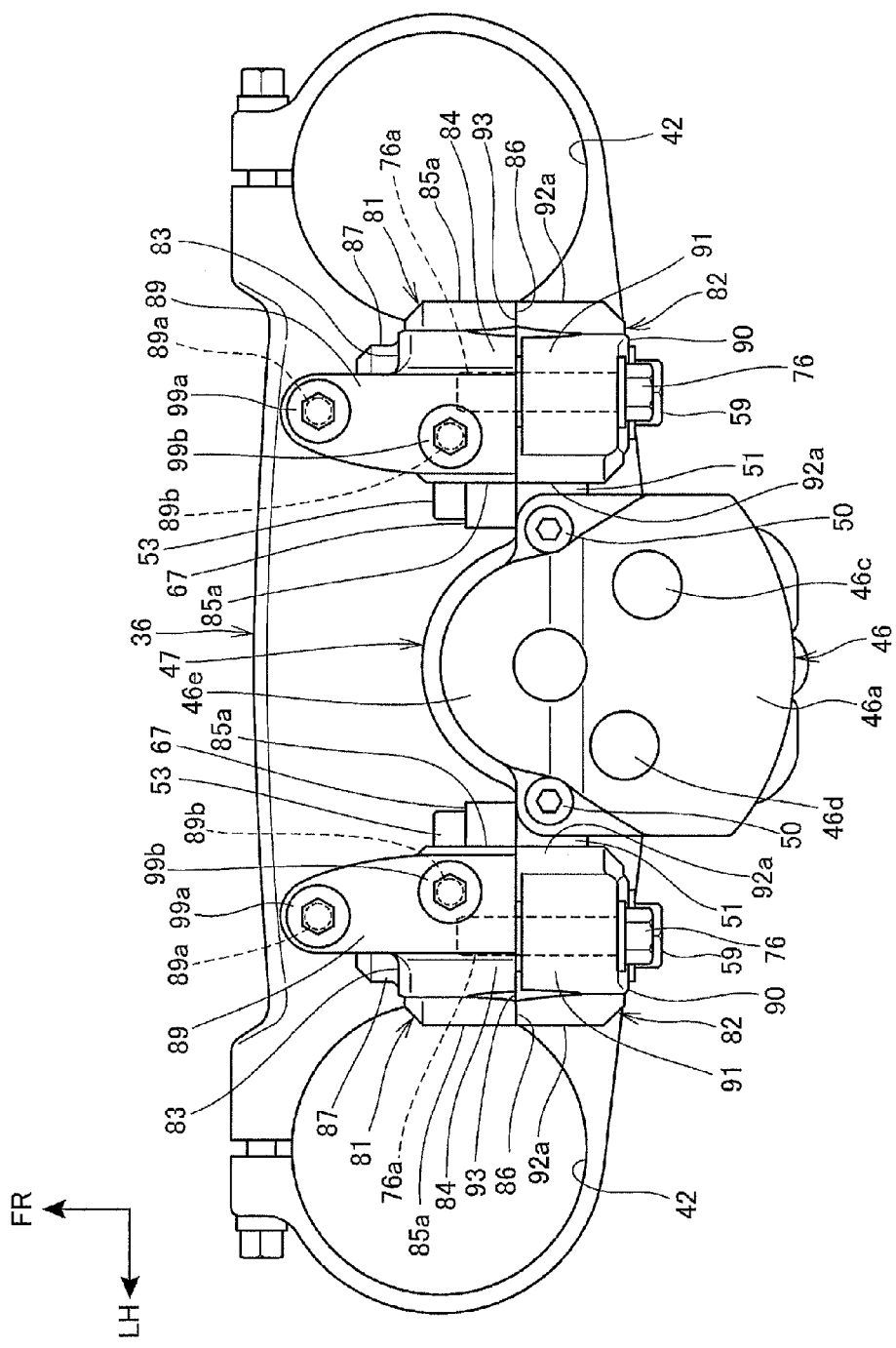
FIG. 10 is a view of the handlebar damper and a top bridge as viewed from the upper side in an axial direction of a steering shaft.

FIG. 10 is a view when the handlebar clampers 61 and the top bridge 36 are viewed from the upper side in the axial direction of the steering shaft 38. In FIG. 10, the bracket 96 and so forth are removed for the convenience of illustration.

As depicted in FIG. 10, the third female threaded portion 89a provided at a front end portion of the upper face 89 is disposed such that it overlaps with a shank 76a of a clamp bolt 76 in the vehicle widthwise direction but is offset forwardly from the shank 76a of the clamp bolt 76 in the forward and rearward direction. Meanwhile, the third female threaded portion 89b disposed behind the third female threaded portion 89a is disposed such that it overlaps with the shank 76a of the clamp bolt 76 in the forward and rearward direction but is offset to the inner side with respect to the shank 76a in the vehicle widthwise direction. Since the third female threaded portions 89a and 89b are disposed in an offset relationship with respect to the shank 76a in this manner, the third female threaded portions 89a and 89b can be provided at a position at which they overlap with the shank 76a in the heightwise direction and can be disposed at a lower position. Therefore, the bracket 96 and so forth can be disposed at a lower position, and the electric part 98 can be prevented from interfering with the occupant.

As described above, with the embodiment to which the present invention is applied, there is provided a handlebar fixing structure including a steering system 35 for steerably supporting a front wheel 2, which is attached for steering to a front portion of a vehicle body, on the vehicle body, a handlebar 30 attached above the steering system 35 and extending in a vehicle widthwise direction, handlebar posts 60 supported above the steering system 35 and supporting the handlebar 30 thereon, and handlebar dampers 61 attached to the handlebar posts 60 for fixing the handlebar 30 to the handlebar posts 60. The handlebar clampers 61 includes a first damper member 81 and a second clamper member 82 disposed across cylindrical portions 71 which are tip end portions of the handlebar posts 60 and the handlebar 30 from a direction orthogonal to the vehicle widthwise direction, elastic members 72 being interposed between the first clamper member 81 and the handlebar posts 60 and between the second damper member 82 and the handlebar posts 60. The first damper member 81 and the second damper member 82 are coupled with each other by a fixing bolt 59 and have abutting faces 86 and 93 for abutting with each other so as to receive axial force of the bolt 59. Consequently, since the handlebar 30 is fixed to the handlebar dampers 61 disposed so as to sandwich the tip end portion of the handlebar posts 60, the handlebar 30 can be attached to a high position and the handlebar clampers 61 can be elastically supported by the elastic members 72 between the handlebar posts 60 and the first clamper member 81 and between the handlebar posts 60 and the second damper member 82. Consequently, the handlebar fixing structure can be obtained which allows the handlebar 30 to be attached to a high position. Thus, a high vibration absorbency is achieved.

Further, the abutting faces 86 and 93 are provided at a position at which the abutting faces 86 and 93 overlap with the fixing bolt 59 as viewed in the vehicle widthwise direction and are disposed on the opposite sides of the fixing bolt 59 in the vehicle widthwise direction. Therefore, the axial force of the fixing bolt 59 can be received effectively on the opposite sides in the vehicle widthwise direction in the proximity of the fixing bolt 59.

Further, the abutting faces 86 and 93 are bent as viewed in an axial direction of the fixing bolt 59. Therefore, the rigidity of the abutting faces 86 and 93 can be raised, and the axial force of the fixing bolt 59 can be received effectively.

Furthermore, the first clamper member 81 includes a first female threaded portion 87a with which the fixing bolt 59 for fixing the first damper member 81 and the second clamper member 82 to the handlebar post 60 is screwed and a second female threaded portion 84a with which a clamp bolt 76 for adjusting clamp load to the handlebar 30 is screwed. Third female threaded portions 89a and 89b, for fixing an electric part 98 to the handlebar damper 61, are provided at an upper portion of the first clamper member 81. Therefore, it is only necessary to perform machining of the female threaded portions 87a, 84a, 89a and 89b only for the first clamper member 81. Thus, the handlebar clampers 61 can be readily manufactured. Further, the different part can be provided above the steering system 35 by a simple configuration making use of the third female threaded portions 89a and 89b.

Further, each of the handlebar post 60, the first clamper member 81 and the second clamper member 82 includes a pair of left and right parts, and a hydraulic chamber 46a of a damper apparatus main body 46 of a steering damper apparatus 45 is disposed between the left and right handlebar posts 60. Therefore, the steering damper apparatus 45 can be provided making use of the space between the left and right handlebar posts 60.

Further, the hydraulic chamber 46a is disposed below the handlebar 30. Therefore, the steering damper apparatus 45 can be provided making use of the space below the handlebar 30.

Further, the handlebar damper 61 includes a lower fixing portion 75 fastened by the fixing bolt 59 and fixed to the handlebar post 60, an upper fixing portion 77 to which the clamp bolt 76 for adjusting clamp load to the handlebar 30 is fastened, and a handlebar fixing portion 78 provided between the upper fixing portion 77 and the lower fixing portion 75 and sandwiching the handlebar 30. The elastic members 72 are fitted with the fixing bolt 59 and provided on the inner side of the lower fixing portion 75 while the abutting faces 86 and 93 are provided on the lower fixing portion 75. Therefore, the handlebar clampers 61 can be elastically supported on the handlebar posts 60 through the elastic members 72 provided on the lower fixing portion 75 of the handlebar dampers 61 extending upwardly and downwardly, and the handlebar 30 can be fixed to the handlebar fixing portion 78 above the lower fixing portion 75. Consequently, the clamp load can be adjusted readily by the upper fixing portion 77.

Now, the fixing structure for the damper apparatus main body 46 of the steering damper apparatus 45 is described in more detail.

Conventionally, a fixing structure for a steering damper apparatus is known wherein the steering damper apparatus is disposed below a central portion of a handlebar in the leftward and rightward direction and is fastened and fixed to a handlebar post, which fixedly supports the handlebar thereon, by a bolt directed in the upward and downward direction. See, for example, Japanese Patent Laid-Open No. 2006-224959.

However, with the conventional fixing structure for a steering damper apparatus, since the handlebar is positioned above the bolt in the axial direction, it is not easy to assure a tool path and the maintainability is restricted. Further, it may be recommendable to dispose the bolt and the handlebar such that the fastening position of the bolt and the handlebar do not overlap with each other. However, also in this case, in a configuration wherein a different part is disposed above the handlebar, the presence of the different part makes it difficult to assure a tool path. Consequently, the maintainability is restricted, or the degree of freedom in disposition of a different part is restricted.

Therefore, in a fixing structure for a steering damper apparatus, it is demanded to make it possible to assure a tool path for fastening a bolt for fixing the steering damper apparatus. Thus, the maintainability and the degree of freedom in disposition of a different part is improved.

Figure 11:
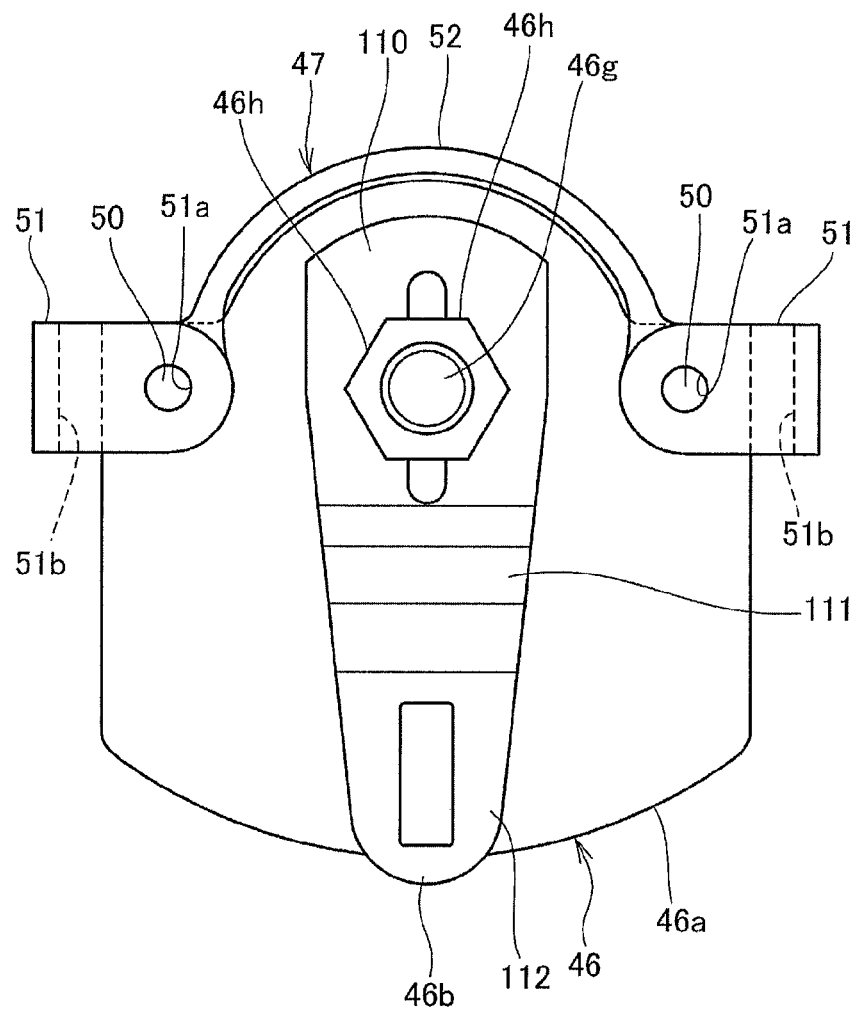
FIG. 11 is a view of a damper apparatus main body as viewed from the lower side.
Figure 12:
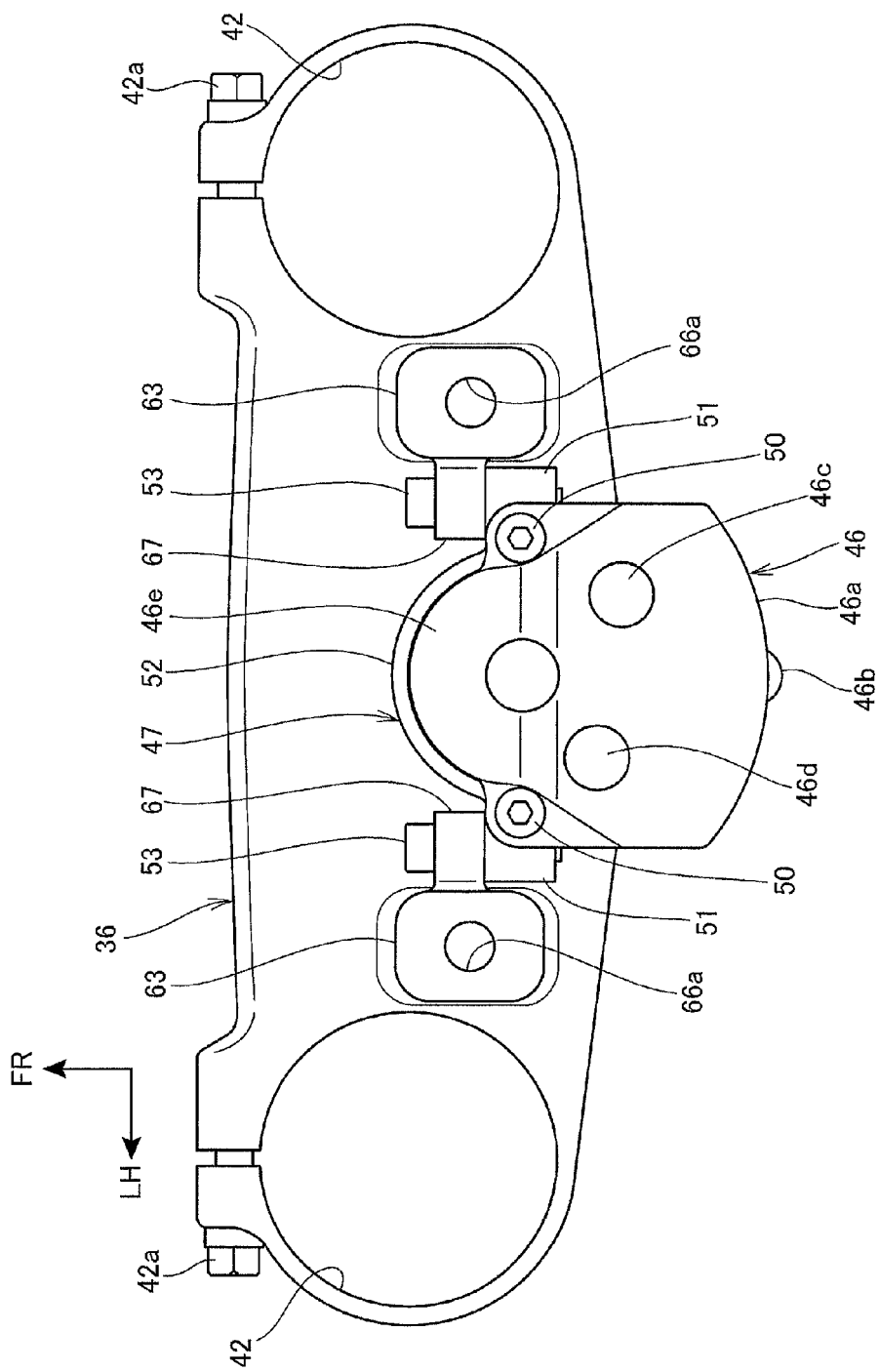
FIG. 12 is a view of a fixing structure for the damper apparatus main body as viewed from the upper side in the axial direction of the steering shaft.
Figure 13:
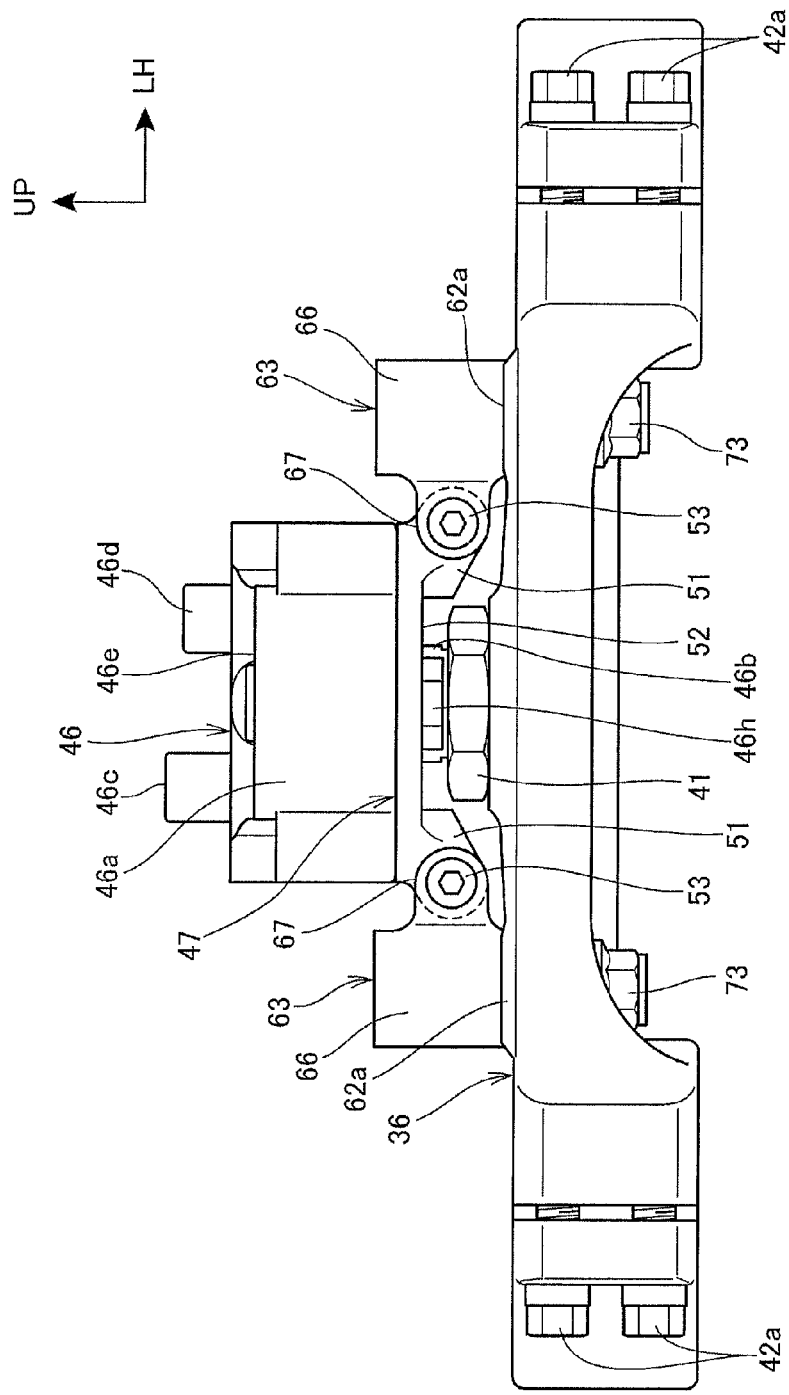
FIG. 13 is a view of the fixing structure for the damper apparatus main body as viewed from the front side in a fastening direction of a stay fixing bolt.
Figure 14:
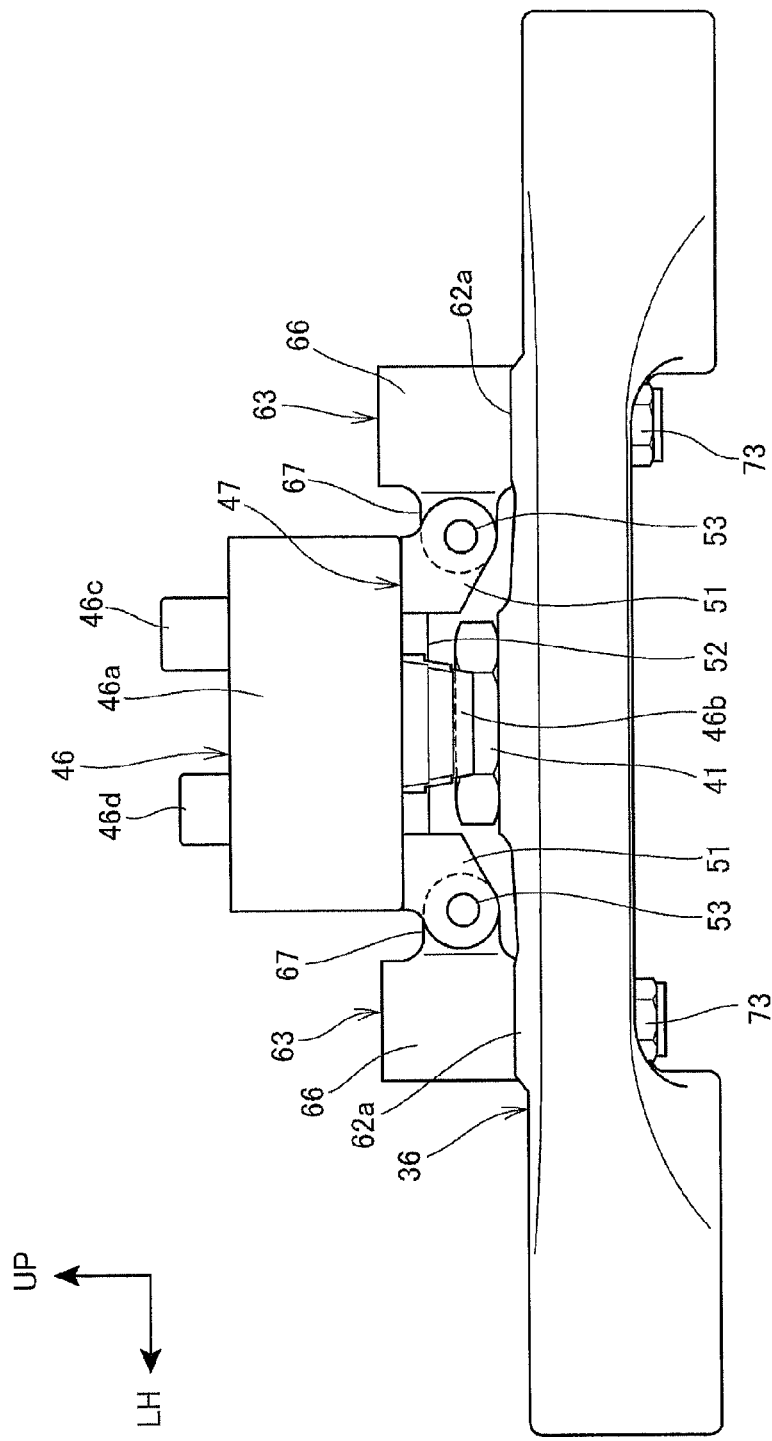
FIG. 14 is a view of the fixing structure for the damper apparatus main body as viewed from the rear side in the fastening direction of the stay fixing bolt.

FIG. 11 is a view of the damper apparatus main body 46 as viewed from the lower side. FIG. 12 is a view of a fixing structure for the damper apparatus main body 46 as viewed from the upper side in the axial direction of the steering shaft 38. FIG. 13 is a view of the fixing structure for the damper apparatus main body 46 as viewed from the front side in the fastening direction of the stay fixing bolt 53. FIG. 14 is a view of the fixing structure for the damper apparatus main body 46 as viewed from the rear side in the fastening direction of the stay fixing bolt 53. In FIGS. 12 to 14, the handlebar 30, post 64, steering shaft 38 and so forth are not depicted.

Referring to FIGS. 5 and 11 to 14, the pivot shaft 46g of the damper apparatus main body 46 is provided at the center in the widthwise direction of a front portion of the case 46a. The case 46a defines a hydraulic chamber on the inner side thereof by wall portions thereof. Therefore, the case 46a can be regarded as a hydraulic chamber.

The arm 46b is formed in a staircase pattern such that it is positioned downwardly toward the rear and includes an upper stage portion 110, a middle stage portion 111 and a lower stage portion 112. The upper stage portion 110 is connected to the pivot shaft 46g, and the middle stage portion 111 is positioned lower than the upper stage portion 110. The lower stage portion 112 is positioned lower than the middle stage portion 111 and connected to the pin 49. The arm 46b is fitted at the upper stage portion 110 thereof with the pivot shaft 46g and is integrally fixed to the pivot shaft 46g by an arm fixing nut 46h fastened to a lower end portion of the pivot shaft 46g. A pin connecting hole 112a is provided on the lower stage portion 112, and the pin 49 is inserted in the pin connecting hole 112a.

The connection portion 52 of the damper stay 47 is formed in an arc so as to prevent interference with an end portion of the upper stage portion 110 which moves along an arcuate locus.

The female threaded portions 51a of the damper stay 47 extend substantially in parallel to the axial line 38a (FIG. 3) of the steering shaft 38. In particular, the female threaded portions 51a and the case fixing bolts 50 fastened to the female threaded portions 51a extend upwardly and downwardly in a direction substantially orthogonal to the upper face of the top bridge 36.

The outer side female threaded portions 51b of the damper stay 47 are provided on the outer sides of the female threaded portions 51a and extend substantially orthogonally to the axial line 38a. In particular, the outer side female threaded portions 51b and the stay fixing bolts 53 fastened to the outer side female threaded portions 51b extend forwardly and rearwardly in a direction substantially in parallel to the upper face of the top bridge 36.

The stay fixing bolts 53 and the case fixing bolts 50 are disposed such that they overlap with each other in side elevation of the vehicle.

Figure 15:
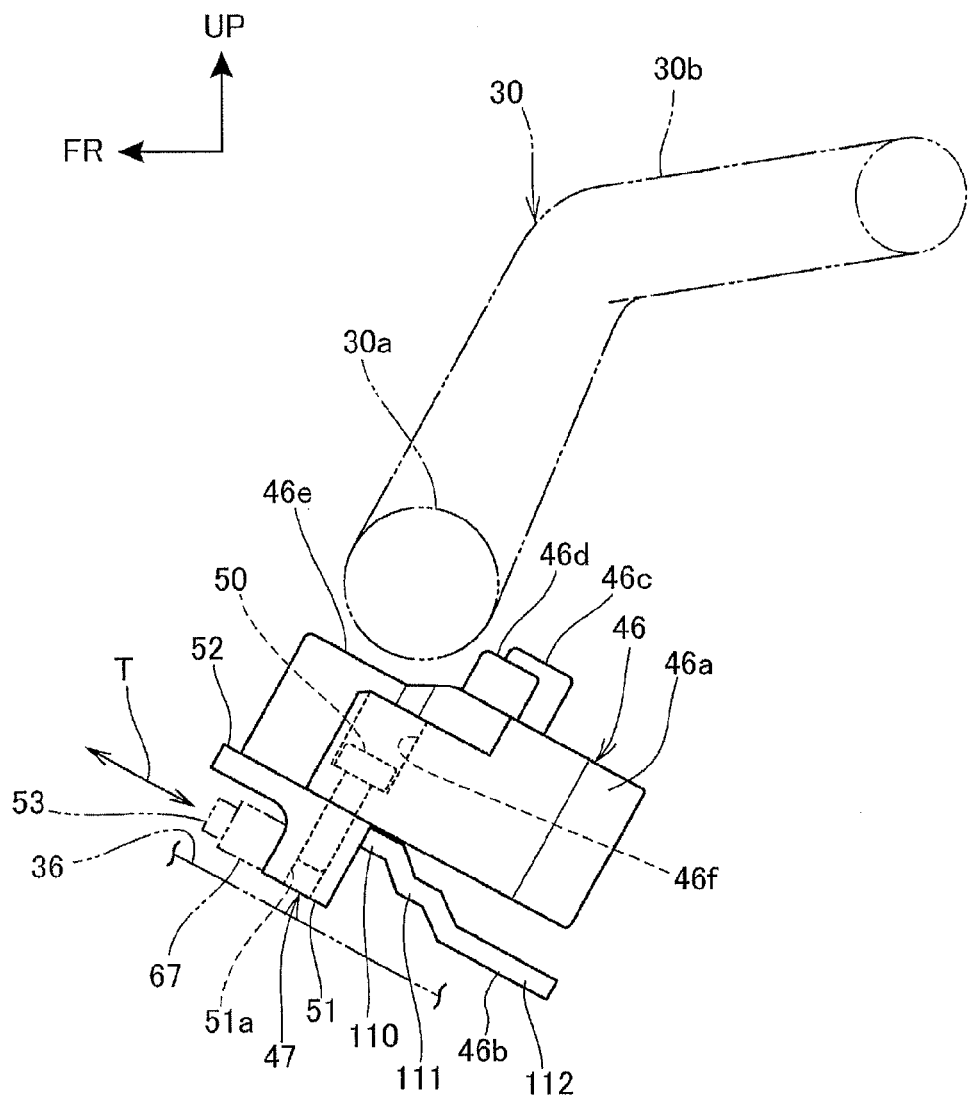
FIG. 15 is a left side elevational view depicting a positional relationship between the damper apparatus main body and the handlebar.

FIG. 15 is a left side elevational view depicting a positional relationship between the damper apparatus main body 46 and the handlebar 30.

The damper stay 47 is fixed to the case 46*a* in advance by the case fixing bolts 50 and integrated with the damper apparatus main body 46. Thereafter, the damper apparatus main body 46 passes from rearwardly between the straight portion 30*a* of the handlebar 30 and the upper face of the top bridge 36 until the fastening portions 51 are abutted with a rear face of the bracket portions 67 of the handlebar posts 60. Then, the damper apparatus main body 46 is fixed by the stay fixing bolts 53 inserted into the bracket portions 67 from the front.

A tool path T (refer to FIGS. 1 and 15), which is a path along which a tool passes when the stay fixing bolts 53 are to be mounted or dismounted, extends forwardly and rearwardly along the axial lines of the stay fixing bolts 53 in front of the stay fixing bolts 53. In other words, the tool path T extends forwardly and rearwardly substantially in parallel to the upper face of the top bridge 36 in front of the handlebar posts 60. Here, the tool mentioned above is a bar-like tool which is fitted, for example, into an angular hole on the head of the stay fixing bolts 53.

In the present embodiment, since the case 46*a* is fixedly fastened to the handlebar posts 60 by the stay fixing bolts 53 directed in the forward and rearward direction, the space between the handlebar posts 60 and the meter 29 can be used as the tool path T. Therefore, the handlebar 30, electric part 98 or the like disposed above the case 46*a* does not interfere with the tool path T, and the stay fixing bolts 53 and the damper apparatus main body 46 can be mounted or dismounted and maintained readily.

Further, since the case fixing bolts 50 are disposed such that they overlap with the stay fixing bolts 53 on the outer sides in the vehicle widthwise direction of the stay fixing bolts 53 as viewed in side elevation of the vehicle, the case 46*a* can be disposed at a lower position. Therefore, the degree of freedom in disposition of the handlebar 30 in the upward and downward direction is high. Further, the case 46*a* has at a front portion thereof the stepped portion 46*e* whose upper face is depressed by one stage, and the straight portion 30*a* is disposed above the stepped portion 46*e*. Therefore, the space of the stepped portion 46*e* can be utilized for disposition of the straight portion 30*a*, and the degree of freedom in disposition of the handlebar 30 in the upward and downward direction is high. Further, the capacity of the hydraulic chamber is assured sufficiently by a rear portion of the case 46*a* which is thicker upwardly and downwardly than the stepped portion 46*e* side.

Further, although the case fixing bolts 50 are disposed at a position at which they overlap with the straight portion 30*a* as viewed in the axial direction of the case fixing bolts 50, since they are fastened before the case 46*a* is fixed to the handlebar posts 60, the case fixing bolts 50 can be fastened readily.

Furthermore, since the operation portions 46*c* and 46*d* of the upper face of the case 46*a* are disposed behind the straight portion 30*a*, the straight portion 30*a* does not interfere with the operation portions 46*c* and 46*d*, and the operation portions 46*c* and 46*d* can be operated readily.

As described above, according to the embodiment to which the present invention is applied, there is provided a steering damper fixing structure for a saddle type vehicle 1 including a steering system 35 for steerably supporting a front wheel 2, which is attached for steering to a front portion of a vehicle body, on the vehicle body, a handlebar 30 attached above the steering system 35 and extending in a vehicle widthwise direction, a pair of left and right handlebar posts 60 supported above the steering system 35 and supporting the handlebar 30 thereon, and a steering damper apparatus 45 including a case 46*a* supported for integral pivotal motion with the steering system 35 at a position between the left and right handlebar posts 60 at which the case 46*a* overlaps with the handlebar 30 as viewed in a direction of an axial line 38*a* of a steering shaft 38, wherein the case 46*a* is fastened to the steering system 35 by stay fixing bolts 53 directed in a forward and rearward direction. Therefore, a part such as an electric part 98 which is positioned above the handlebar 30 or the steering damper apparatus 45 does not interfere with a tool path T for the stay fixing bolts 53. Therefore, the maintainability of the steering damper apparatus 45 and the degree of freedom in disposition of a different part can be improved.

Further, the pair of left and right handlebar posts 60 are configured independently of each other and the case 46*a* is fixed to a damper stay 47 fixed to and supported on each of the left and right handlebar posts 60, and the damper stay 47 is fastened to the handlebar posts 60 by the stay fixing bolts 53 directed in the forward and rearward direction. Therefore, even where the distance between the left and right handlebar posts 60 is changed, if only the damper stay 47 is changed in accordance with the change, then the case 46*a* can be fixed. Therefore, it is possible to easily cope with a change in setting of the left and right handlebar posts 60.

Further, each of the handlebar posts 60 includes a post 64 for supporting the handlebar 30 at the upper portion of the handlebar post 60 and a base 63 configured independently of the post 64 at a lower portion of the post 64. A bracket portion 67 to which the case 46*a* is fastened is provided on the base 63 and the base unit 63 is fastened together with the post 64 to the steering system 35. Therefore, since the posts 64 having a function for supporting the handlebar 30 and the bracket portions 67 having a function for supporting the case 46*a* are separated from each other, it is possible to cope with an individual change in the shape of the handlebar 30 and the case 46*a*. Therefore, the degree of freedom in change of setting is high. Further, since the posts 64 and the bases 63 are separate from each other, only the posts 64 can be mounted or dismounted while the case 46*a* remains fixed to the base 63. Therefore, the maintainability is high.

Further, the stay fixing bolts 53 are disposed substantially in parallel to an upper face of a top bridge 36 of the steering system 35. Therefore, the stay fixing bolts 53 can be mounted and dismounted readily making use of the space along the upper face of the top bridge 36.

It is to be noted that the embodiment described above indicates a mode to which the present invention is applied, and the present invention is not restricted to the embodiment.

While it is described in the foregoing description of the embodiment that the steering system 35 steerably supports the front wheel 2, the present invention is not limited to this, but it is only necessary for the steering system 35 to steer the front side traveling unit. For example, the steering system 35 may steerably support a sled which is a front side traveling unit of a snow mobile. Further, the present invention can be applied not only to a motorcycle but also to various vehicles such as a three-wheeled vehicle, a four-wheeled vehicle and a snow mobile.

Further, while it is described in the foregoing description of the embodiment that the first female threaded portion 87a, second female threaded portion 84a and third female threaded portions 89a and 89b are provided on the first clamper member 81, the present invention is not limited to this, but it is only necessary for the female threaded portions 87a, 84a, 89a and 89b to be provided collectively on one of the first damper member 81 and the second damper member 82. Where the first female threaded portions 87a, 84a, 89a and 89b are provided on the second clamper member 82, the fixing bolts 59 and the clamp bolts 76 may be inserted from the front side, and the female threaded portions 89a and 89b may be provided on an extension which extends rearwardly from an upper end portion of the second clamper member 82.

Further, while it is described in the foregoing description of the embodiment that the bracket 96 is attached as a different part on the upper faces 89 of the first damper members 81, the type of the part to be attached to the upper faces 89 is not limited specifically. Further, while it is described in the foregoing description of the embodiment that the electric part 98 is attached through the bracket 96 or the like, a part other than the electric part 98 may be attached.

Further, while it is described in the foregoing description of the embodiment that the handlebar post 60 includes two parts of the base 63 and the post 64, the base 63 and the post 64 may otherwise be formed as a unitary member.

Further, while it is described in foregoing description of the embodiment that the handlebar post 60 is fixed to the top bridge 36, the handlebar post 60 may otherwise be provided integrally with the steering system 35 and may be provided, for example, integrally with the top bridge 36.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A handlebar fixing structure, comprising:
    a steering system for steerably supporting a front wheel attached to a front portion of a vehicle body;
    a handlebar attached above the steering system and extending in a vehicle widthwise direction;
    a handlebar post supported above the steering system and supporting the handlebar thereon, said handlebar post being fastened on a base by a fixing bolt in a height direction of the vehicle;
    a handlebar clamper attached to the handlebar post for fixing the handlebar to the handlebar post;
    the handlebar clamper includes a first clamper member and a second clamper member disposed across a tip end portion of the handlebar post and the handlebar from a direction orthogonal to the vehicle widthwise direction; and
    an elastic member being interposed between the first clamper member and the handlebar post and between the second clamper member and the handlebar post, a part of the elastic member being interposed in the handlebar post in a vehicle forward and rearward direction;
    the first clamper member and the second clamper member being coupled with each other by a bolt and having abutting faces for abutting with each other so as to receive an axial force of the bolt.

2. The handlebar fixing structure according to claim 1, wherein the abutting faces are provided at a position at which the abutting faces overlap with the bolt as viewed in the vehicle widthwise direction and are disposed on the opposite sides of the bolt in the vehicle widthwise direction.

3. The handlebar fixing structure according to claim 2, wherein the abutting faces are bent as viewed in an axial direction of the bolt.

4. The handlebar fixing structure according to claim 1, wherein one of the first clamper member and the second clamper member includes a first female threaded portion wherein the bolt for fixing the first clamper member and the second clamper member to the handlebar post is screwed and a second female threaded portion wherein a clamp bolt for adjusting clamp load to the handlebar is screwed with a third female threaded portion for fixing a different part to the handlebar clamper being provided at an upper portion of the one clamper member.

5. The handlebar fixing structure according to claim 2, wherein one of the first clamper member and the second clamper member includes a first female threaded portion wherein the bolt for fixing the first clamper member and the second clamper member to the handlebar post is screwed and a second female threaded portion wherein a clamp bolt for adjusting clamp load to the handlebar is screwed with a third female threaded portion for fixing a different part to the handlebar clamper being provided at an upper portion of the one clamper member.

6. The handlebar fixing structure according to claim 1, wherein each of the handlebar post, the first clamper member and the second damper member includes a pair of left and right parts, and a hydraulic chamber of a steering damper apparatus is disposed between the left and right handlebar posts.

7. The handlebar fixing structure according to claim 2, wherein each of the handlebar post, the first damper member and the second clamper member includes a pair of left and right parts, and a hydraulic chamber of a steering damper apparatus is disposed between the left and right handlebar posts.

8. The handlebar fixing structure according to claim 4, wherein each of the handlebar post, the first clamper member and the second clamper member includes a pair of left and right parts, and a hydraulic chamber of a steering damper apparatus is disposed between the left and right handlebar posts.

9. The handlebar fixing structure according to claim 6, wherein the hydraulic chamber is disposed below the handlebar.

10. The handlebar fixing structure according to claim 1, wherein the handlebar clamper includes a lower fixing portion fastened by the bolt and fixed to the handlebar post, an upper fixing portion to which a clamp bolt for adjusting a clamp load to the handlebar is fastened, and a handlebar fixing portion provided between the upper fixing portion and the lower fixing portion and sandwiching the handlebar, and the elastic member is fitted with the bolt and provided on an inner side of the lower fixing portion while the abutting faces are provided on the lower fixing portion.

11. A steering damper fixing structure for a saddle vehicle, comprising:
    a steering system for steerably supporting a front wheel attached for steering to a front portion of a vehicle body;
    a handlebar attached above the steering system and extending in a vehicle widthwise direction;

a pair of left and right handlebar posts supported above the steering system and supporting the handlebar thereon, said pair of left and right handlebar posts each being fastened on a base by a fixing bolt in a height direction of the vehicle;

a plurality of elastic members wherein a part of selected elastic members is interposed in each of the pair of left and right handlebar posts; and a steering damper apparatus including a hydraulic chamber supported for integral pivotal motion with the steering system at a position between the left and right handlebar posts at which the hydraulic chamber overlaps with the handlebar as viewed from a steering shaft direction;

wherein the hydraulic chamber is fastened to the steering system by a bolt directed in a forward and rearward direction.

12. The steering damper fixing structure for a saddle vehicle according to claim 11, wherein the pair of left and right handlebar posts are configured independently of each other, the hydraulic chamber is fixed to a damper stay fixed to and supported on each of the left and right handlebar posts, and the damper stay is fastened to the handlebar posts by the bolt directed in the forward and rearward direction.

13. The steering damper fixing structure for a saddle vehicle according to claim 11, wherein each of the handlebar posts includes a post for supporting the handlebar at an upper portion of the handlebar posts and the base unit configured independently of the post on a lower side of the post with a bracket portion to which the hydraulic chamber is fastened being provided on the base unit and the base unit is fastened together with the post to the steering system.

14. The steering damper fixing structure for a saddle vehicle according to claim 12, wherein each of the handlebar posts includes a post for supporting the handlebar at an upper portion of the handlebar posts and the base unit configured independently of the post on a lower side of the post with a bracket portion to which the hydraulic chamber is fastened being provided on the base unit and the base unit is fastened together with the post to the steering system.

15. The steering damper fixing structure for a saddle vehicle according to claim 11, wherein the bolt directed in the forward and rearward direction is disposed substantially in parallel to an upper face of a top bridge of the steering system.

16. A handlebar fixing structure, comprising:
a steering system for steerably supporting a front wheel attached to a front portion of a vehicle body;
a handlebar attached above the steering system and extending in a vehicle widthwise direction;
a handlebar post supported above the steering system and supporting the handlebar thereon;
a handlebar clamper attached to the handlebar post for fixing the handlebar to the handlebar post;
the handlebar clamper includes a first clamper member and a second clamper member disposed across a tip end portion of the handlebar post and the handlebar from a direction orthogonal to the vehicle widthwise direction; and
an elastic member being interposed between the first clamper member and the handlebar post and between the second clamper member and the handlebar post, a part of the elastic member being interposed in the handlebar post in a vehicle forward and rearward direction;
the first clamper member and the second clamper member being coupled with each other by a bolt and having abutting faces for abutting with each other so as to receive an axial force of the bolt, wherein the abutting faces are bent as viewed in an axial direction of the bolt.

17. A steering damper fixing structure for a saddle vehicle, comprising:
a steering system for steerably supporting a front wheel attached for steering to a front portion of a vehicle body;
a handlebar attached above the steering system and extending in a vehicle widthwise direction;
a pair of left and right handlebar posts supported above the steering system and supporting the handlebar thereon; and
a steering damper apparatus including a hydraulic chamber supported for integral pivotal motion with the steering system at a position between the left and right handlebar posts at which the hydraulic chamber overlaps with the handlebar as viewed from a steering shaft direction;
wherein the hydraulic chamber is fastened to the steering system by a bolt directed in a forward and rearward direction and the bolt is directed in the forward and rearward direction is disposed substantially in parallel to an upper face of a top bridge of the steering system.

* * * * *